(12) United States Patent
Saha et al.

(10) Patent No.: US 12,520,154 B2
(45) Date of Patent: Jan. 6, 2026

(54) SYSTEM AND METHOD FOR MACHINE LEARNING ASSISTED SECURITY ANALYSIS OF 5G NETWORK CONNECTED SYSTEMS

(71) Applicant: The Trustees of Princeton University, Princeton, NJ (US)

(72) Inventors: Tanujay Saha, Princeton, NJ (US); Niraj K. Jha, Princeton, NJ (US); Najwa Aaraj, Dubai (AE)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 434 days.

(21) Appl. No.: 18/035,847

(22) PCT Filed: Nov. 8, 2021

(86) PCT No.: PCT/US2021/058421
§ 371 (c)(1),
(2) Date: May 8, 2023

(87) PCT Pub. No.: WO2022/099115
PCT Pub. Date: May 12, 2022

(65) Prior Publication Data
US 2023/0422039 A1    Dec. 28, 2023

Related U.S. Application Data

(60) Provisional application No. 63/111,306, filed on Nov. 9, 2020.

(51) Int. Cl.
*H04L 9/40* (2022.01)
*G06N 7/01* (2023.01)
*H04W 12/122* (2021.01)

(52) U.S. Cl.
CPC ............ *H04W 12/122* (2021.01); *G06N 7/01* (2023.01); *H04L 63/1433* (2013.01)

(58) Field of Classification Search
CPC ....... G06N 5/022; G06N 20/20; H04W 12/12; G06F 2009/45587; G06F 9/45558
See application file for complete search history.

(56) References Cited

U.S. PATENT DOCUMENTS 10,747,886 B2 * 8/2020 El-Moussa ............. G06N 3/047
11,818,172 B1 * 11/2023 Miretsky ............. H04L 63/1408
(Continued)

FOREIGN PATENT DOCUMENTS

WO    2020219157 A1    10/2020

OTHER PUBLICATIONS

Brown, Jacob et al., "GRAVITAS: Graphical reticulated attack vectors for internet-of-things aggregate security," IEEE Transactions on Emerging Topics in Computing, vol. PP, No. 99, p. 1, May 2021.
(Continued)

*Primary Examiner* — Beemnet W Dada
(74) *Attorney, Agent, or Firm* — Meagher Emanuel Laks Goldberg & Liao, LLP

(57) ABSTRACT

According to various embodiments, a method for detecting security vulnerabilities in a fifth generation core network (5GCN) is disclosed. The method includes constructing an attack graph from a plurality of regular expressions. Each regular expression corresponds to a sequence of system level operations for a known 5GCN attack. The method further includes performing a linear search on the attack graph to determine unexploited 5GCN attack vectors where path in the attack graph that does not represent a known 5GCN attack vector represents an unexploited 5GCN attack vector. The method also includes applying a trained machine learning module to the attack graph to predict new 5GCN attacks. The trained machine learning module is configured to determine a feasibility of linking unconnected nodes in the attack (Continued)

graph to create a new branch representing a new 5GCN vulnerability exploit.

16 Claims, 26 Drawing Sheets

(56) References Cited

U.S. PATENT DOCUMENTS

| | | | | |
|---|---|---|---|---|
| 11,836,250 | B2* | 12/2023 | Grossman | G06F 21/554 |
| 11,973,771 | B2* | 4/2024 | Saha | G06N 20/00 |
| 2008/0172716 | A1 | 7/2008 | Talpade et al. | |
| 2018/0300124 | A1 | 10/2018 | Malladi et al. | |
| 2019/0364420 | A1 | 11/2019 | Rommer et al. | |
| 2022/0303290 | A1* | 9/2022 | Baidya | H04L 63/1441 |

OTHER PUBLICATIONS

Kotenko, Igor and Stepashkin, Mikhail, "Attack graph based evaluation of network security", Communications and Multimedia Security, 10th IFIP TC-6 TC-11 International Conference (CMS) 2006, pp. 216-227, Oct. 2006.

Suomalainen, Jani et al., "Machine learning threatens 5G security," IEEE Access, vol. 8, pp. 190 822-190 842, Oct. 1, 2020.

Haider, Noman et al., "Artificial intelligence and machine learning in 5G network security: Opportunities, advantages, and future research trends", arXiv preprint arXiv:2007.04490, Jul. 8, 2020.

Hussain, Syed Rafiul et al., "Privacy attacks to the 4G and 5G cellular paging protocols using side channel information", Proceedings 2019 Network and Distributed System Security Symposium, vol. 19, pp. 24-27, 2019.

Hussain, Syed Rafiul et al., "5GReasoner: A property-directed security and privacy analysis framework for 5G cellular network protocol", in Proceedings ACM SIGSAC Conference on Computer and Communications Security, pp. 669-684, Nov. 2019.

Borgaonkar, Ravishankar et al., "New privacy threat on 3G, 4G, and upcoming 5G AKA protocols," Proceedings on Privacy Enhancing Technologies, vol. 2019, No. 3, pp. 108-127, Jul. 1, 2019.

Ferrag, Mohamed Amine et al., "Security for 4G and 5G cellular networks: A survey of existing authentication and privacy-preserving schemes," Journal of Network and Computer Applications, vol. 101, No. 3, pp. 55-82, Nov. 1, 2017.

Behrad, Shanay et al., "Securing authentication for mobile networks, a survey on 4G issues and 5G answers," 2018 21st Conference on Innovation in Clouds, Internet and Networks and Workshops (ICIN), pp. 1-8, Feb. 1, 2018.

Dehnel-Wild, Martin and Cremers, Cas, "Security vulnerability in 5G-AKA draft," Department of Computer Science, University of Oxford, Tech. Rep., pp. 14-37, 2018.

Basin, David et al., "A formal analysis of 5G authentication," Proc. ACM SIGSAC Conf. on Computer and Communications Security, pp. 1383-1396, Oct. 15, 2018.

Cremers, Cas and Dehnel-Wild, Martin, "Component-based formal analysis of 5G-AKA: Channel assumptions and session confusion," Network and Distributed System Security Symposium, Jan. 1, 2019.

Rösler, Paul et al., "More is less: On the end-to-end security of group chats in Signal, What sApp, and Threema," 2018 IEEE European Symposium on Security and Privacy (EuroS&P), pp. 415-429, Apr. 1, 2018.

Vigo, Martin, "Compromising Online Accounts by Cracking Voicemail Systems", Aug. 14, 2018, available online: https://www.martinvigo.com/voicemailcracker/.

Kreutz, Diego et al., "Towards secure and dependable software-defined networks," iProceedings of the second ACM SIGCOMM workshop on Hot topics in software defined networking, pp. 55-60, Aug. 2013.

Scott-Hayward, Sandra et al., "A survey of security in software defined networks," IEEE Communications Surveys & Tutorials, vol. 18, No. 1, pp. 623-654, Jul. 6, 2015.

Cao, Jiahao et al., "The crosspath attack: Disrupting the SDN control channel via shared links," 28th USENIX Security Symposium, pp. 19-36, Aug. 2019.

Alharbi, Talal et al., "The (in)security of topology discovery in software defined networks," International Journal of Network Security & Its Applications (IJNSA), vol. 10. No. 3, May 2018.

Marin, Eduard et al., 2019 ACM SIGSAC Conference on Computer and Communications Security, pp. 1101-1114, Nov. 2019.

European Telecommunications Standards Institute (ETSI), "Network Functions Virtualisation (NFV); NFV Security; Problem Statement," Oct. 2014.

Morgan, Benoît et al., "IOMMU protection against I/O attacks: A vulnerability and a proof of concept," Journal of the Brazilian Computer Society, vol. 24, No. 1, p. 2, Jan. 9, 2018.

Markettos, A. Theodore et al., "Thunderclap: Exploring vulnerabilities in operating system IOMMU protection via DMA from untrustworthy peripherals," Network and Distributed Systems Security (NDSS) Symposium 2019, Feb. 2019.

Li, Shih-Wei et al., "Protecting cloud virtual machines from hypervisor and host operating system exploits," 28th USENIX Security Symposium, pp. 1357-1374, Aug. 2019.

Koutsos, Adrien, "The 5G-AKA authentication protocol privacy (technical report)," 2019 IEEE European Symposium on Security and Privacy (EuroS&P), Jun. 1, 2019.

Edris, E.K.K. et al., "Formal verification and analysis of primary authentication based on 5G-AKA protocol," Seventh International Conference on Software Defined Systems (SDS), pp. 256-261, Apr. 1, 2020.

Leu, Fang-Yie et al., "A fault tolerant mechanism for UE authentication in 5G networks," Mobile Networks and Applications, vol. 26, pp. 1-18, 2020.

European Telecommunications Standards Institute (ETSI), 3GPP Global Initiative, "5G; Security architecture and procedures for 5G System (3GPP TS 33.501 version 16.3.0 Release 16)", 2020.

Iqbal, Mansoor, "WhatsApp Revenue and Usage Statistics (2023)", Business of Apps, available online: https://www.businessofapps.com/data/whatsapp-statistics/.

Sengupta, Satadal et al., "Exploiting diversity in Android TLS implementations for mobile app traffic classification," World Wide Web Conference, pp. 1657-1668, May 2019.

Weinmann, Ralf-Philipp, "Baseband attacks: Remote exploitation of memory corruptions in cellular protocol stacks," Workshop on Offensive Technologies, pp. 12-21, Aug. 6, 2012.

Xenakis, Christos and Ntantogian, Christoforos, "Attacking the baseband modem of mobile phones to breach the users' privacy and network security," 57th International Conference on Cyber Conflict: Architectures in Cyberspace, pp. 231-244, May 1, 2015.

Paganini, Pierluigi, "WhatsApp lack enforcing certificate pinning, users exposed to MITM", Security Affairs, Feb. 22, 2014, available online: https://securityaffairs.co/22449/hacking/whatsapp-lack-certificate-pinning.html.

Sriram, P. et al., "5G security: Concepts and challenges," 5G Enabled Secure Wireless Networks, pp. 1-43, 2019.

Saha, Tanujay et al., "SHARKS: Smart Hacks, Attacks, RisKs, and Security in Internet of Things based on Machine Learning", IEEE Transactions on Emerging Topics in Computing, vol. 10, pp. 870-885, Jan. 13, 2021.

First Inc., Common vulnerability scoring system version 3.1 specification document, 2019, available online: https://www.first.org/cvss/v3.1/specification-document.

Ur-Rehman, A. et al., "Vulnerability modelling for hybrid IT systems," 2019 IEEE International Conference on Industrial Technology (ICIT), pp. 1186-1191, Feb. 1, 2019.

Aksu, M. Ugar et al., "A Quantitative CVSS-Based Cyber Security Risk Assessment Methodology For IT Systems," 2017 International Carnahan Conference on Security Technology (ICCST), pp. 1-8, 2017.

Ou, Xinming and Singhal, Anoop, "Quantitative Security Risk Assessment of Enterprise Networks," Springer, 2012.

Noel, S. et al., "Measuring security risk of networks using attack graphs", International Journal of Next-Generation Computing, vol. 1, No. 1, pp. 135-147, Jul. 2010.

(56) References Cited

OTHER PUBLICATIONS

Malowidzki, Marek et al., "TAG: Topological attack graph analysis tool," 2019 3rd Cyber Security in Networking Conference (CSNet), pp. 158-160, 2019.

Mosenia, Arsalan and Jha, Niraj K., "A comprehensive study of security of Internet-of-Things," IEEE Transactions on Emerging Topics in Computing, vol. 5, No. 4, pp. 586-602, 2017.

Bosche, Ann et al., "Unlocking Opportunities in the Internet of Things", Bain & Company, Aug. 7, 2018, available online: https://www.bain.com/insights/unlocking-opportunities-in-the-internet-of-things/.

Akmandor, Ayten Ozge and Jha, Niraj K., "Smart health care: An edge-side computing perspective," IEEE Consumer Electronics Magazine, vol. 7, No. 1, pp. 29-37, 2018.

Stojkoska, Biljana L. Risteka and Trivodaliev, Kire V., "A review of Internet of Things for smart home: Challenges and solutions," Journal of Cleaner Production, vol. 140, pp. 1454-1464, 2017.

Zhang, Ruonan and Liu, Xinbao, "IoT-based maintenance process design for fusion reactor remote handling system," Journal of Fusion Energy, vol. 33, No. 6, pp. 653-657, 2014.

Yun, Miao and Yuxin, Bu, "Research on the architecture and key technology of Internet of Things (IoT) applied on smart grid," Proceedings from the IEEE International Conference on Advances in Energy Engineering, pp. 69-72, 2010.

Al-Ali, A.R. and Aburukba, Raafat, "Role of Internet of Things in the smart grid technology", Journal of Computer and Communications, vol. 3, No. 5, pp. 229-233, Jan. 1, 2015.

Datta, Soumya Kanti et al., "Integrating Connected Vehicles in Internet of Things Ecosystems: Challenges and Solutions", IEEE 17th International Symposium on A World of Wireless, Mobile and Multimedia Networks (WoWMoM), pp. 1-6, Jun. 21, 2016.

Thierer, Adam and Castillo, Andrea, "Projecting the growth and economic impact of the Internet of Things", Mercatus Center, George Mason University, Arlington, VA, Economic Perspectives, 2015, available online: https://www.mercatus.org/system/files/IoT-EP-v3.pdf.

Stavridis, James and Weinstein, Dave, "The Internet of Things Is a Cyberwar Nightmare", Foreign Policy, Nov. 3, 2016, available online: https://foreignpolicy.com/2016/11/03/the-internet-of-things-is-a-cyber-war-nightmare/.

Lewis, James Andrew, "Managing Risk for the Internet of Things", Center for Strategic and International Studies, Feb. 17, 2016, available online: https://csis-website-prod.s3.amazonaws.com/s3fs-public/legacy_files/files/publication/160217_Lewis_ManagingRiskIoT_Web_Redated.pdf.

Markey, Edward J. and Blumenthal, Richard, Letter to acting administrator James Owen concerning cybersecurity issues with internet-connected cars, United States Senate, available online: https://www.markey.senate.gov/imo/media/doc/NHTSA%20Cybersecurity%20Followup.pdf, Jun. 11, 2020.

Margolis, J. et al., "An in-depth analysis of the Mirai botnet," in Proceedings of the International Conference on Software Security and Assurance, pp. 6-12, 2017.

Saha, Tanujay and Sehwag, Vikash, "TV-PUF: a fast lightweight analog physical unclonable function," 2016 IEEE International Symposium on Nanoelectronic and Information Systems (iNIS), pp. 182-186, Dec. 1, 2016.

Mckay, Kerry A. et al., "Report on Lightweight Cryptography", National Institute of Standards and Technology, U.S. Department of Commerce, Mar. 2017.

Nia, Arsalan Moshen et al., "Physiological information leakage: A new frontier in health information security," IEEE Transactions on Emerging Topics in Computing, vol. 4, No. 3, pp. 321-334, 2016.

Matrosov, Aleksandr et al., "Stuxnet under the microscope," ESET LLC, available online: https://www.esetnod32.ru/company/viruslab/analytics/doc/Stuxnet_Under_the_Microscope.pdf.

Hernandez, Grant et al., "A smart Nest thermostat: A spy in your home," Black Hat USA, 2014, available online: https://www.blackhat.com/docs/us-14/materials/us-14-Jin-Smart-Nest-Thermostat-A-Smart-Spy-In-Your-Home-WP.pdf.

Juels, Ari et al., "The blocker tag: Selective blocking of RFID tags for consumer privacy," Proceedings of the ACM Conference on Computer and Communications Security, pp. 103-111, Jan. 1, 2003.

Huang, Ling et al., "Adversarial Machine Learning," Proceedings of 4th ACM Workshop on Artificial Intelligence and Security, pp. 43-58, Oct. 21, 2011.

IBM Security, "Penetration testing: Protect critical assets using an attacker's mindset," IBM Corporation, 2019, available online: https://www.ibm.com/downloads/cas/MY6L2O89.

Ou, Xinming et al., "MulVAL: A logic-based network security analyzer", USENIX Security Symposium, vol. 8, pp. 113-128, Jul. 31, 2005.

Jajodia, Sushil and Noel, Steven, "Topological vulnerability analysis", Cyber Situational Awareness, pp. 139-154, 2010.

Al Ghazo, Alaa T. et al., "A2G2V: Automatic attack graph generation and visualization and its applications to computer and SCADA networks," IEEE Transactions on Systems, Man, and Cybernetics: Systems, pp. 1-11, 2019.

Barrére, Martin and Lupu, Emil C., "Naggen: a Network Attack Graph GENeration Tool", 2017 IEEE Conference on Communications and Network Security (CNS), pp. 378-379, Oct. 1, 2017.

Kordy, Barbara et al., "DAG-Based Attack and Defense Modeling: Don't Miss the Forest for the Attack Trees," Computer Science Review, vol. 13-14, pp. 1-38, Mar. 29, 2013.

Hahm, Oliver et al., "Operating Systems for Low-End Devices in the Internet of Things: a Survey," IEEE Internet of Things Journal, vol. 3, No. 5, p. 1, Dec. 4, 2015.

Dulaunoy, A. et al., CVE-search project, CVE-Search, available online: http://cve-search.org.

OpenVAS—Open Vulnerability Assessment Scanner, Greenbone Networks GmbH, available online: https://www.openvas.org/.

Condoluci, M. et al., "Softwarization and virtualization in 5G networks for smart cities", EAI International Conference on Cyber physical systems, IoT and sensors Networks (CYCLONE), Oct. 1, 2015.

Ordonez-Lucena, J. et al., "Network slicing for 5G with SDN/NFV: Concepts, architectures, and challenges", IEEE Communications Magazine, vol. 55, No. 5, pp. 80-87, Mar. 14, 2017.

Panwar, N. et al., "A survey on 5G: The next generation of mobile communication," Physical Communication, vol. 18, pp. 64-84, Jan. 1, 2016.

Sens, Ronald, "Be ready to fight new 5G vulnerabilities," Network Security, vol. 2018, No. 10, pp. 6-7, Oct. 2018.

Jover, R.P. and Marojevic, V., "Security and protocol exploit analysis of the 5G specifications", IEEE Access, vol. 7, pp. 24956-24963, Feb. 13, 2019.

Ahmad, Ijaz et al., "Overview of 5G security challenges and solutions", IEEE Communications Standards Magazine, vol. 2, No. 1, pp. 36-43, Mar. 1, 2018.

P. P. Sriram, H. Wang, H. G. Jami, and K. Srinivasan, "5G security: Concepts and challenges," in 5G Enabled Secure Wireless Networks, 2019, pp. 1-43.

Sutikno, Tole et al., "WhatsApp, Viber and Telegram: Which is the best for instant messaging?" International Journal of Electrical & Computer Engineering, vol. 6, No. 3, pp. 909-914, Jun. 1, 2016.

Ahmad, Ijaz et al., "5G security: Analysis of threats and solutions", 2017 IEEE Conference on Standards for Communications and Networking (CSCN), pp. 193-199, Sep. 1, 2017.

Schneider, Peter and Horn, Gunther, "Towards 5G security," in Proceedings from IEEE Trustcom/BigDataSE/ISPA, vol. 1, pp. 1165-1170, 2015.

J. C. C. Chica, J. C. Imbachi, and J. F. Botero, "Security in SDN: A comprehensive survey," J. Network and Computer Applications, 2020.

Yoon, Changhoon et al., "Flow wars: Systemizing the attack surface and defenses in software-defined networks," IEEE/ACM Transactions on Networking, vol. 25, No. 6, pp. 3514-3530, 2017.

Lal, S. et al., "NFV: Security threats and best practices", IEEE Communications Magazine, vol. 55, No. 8, pp. 211-217, May 15, 2017.

Cunha, Vitor A. et al., "Network slicing security: Challenges and directions", Internet Technology Letters, vol. 2, No. 5, p. e125, Jul. 29, 2019.

(56) References Cited

OTHER PUBLICATIONS

International Search Report and Written opinion for corresponding PCT Application No. PCT/US2021/058421, dated Feb. 28, 2022.

Binyamini et al., "An Automated, End-to-End Framework for Modeling Attacks From Vulnerability Descriptions", arXiv:2008.04377v1, Aug. 10, 2020.

Cheng et al., "An integrated network scanning tool for attack graph construction", International Conference on Grid and Pervasive Computing, Springer, Berlin, Heidelberg, May 2011.

Wan et al., "Security Analysis Of 5G Mobile Networks", 2019 Fall Technical Forum, Sep. 30-Oct. 1, 2019.

\* cited by examiner

| Operation | Definition | $A = \{a, b\}; B = \{c, d\}$<br>Example |
|---|---|---|
| Set Union (+) | Set union of two regular expressions | $A + B = \{a, b, c, d\}$ |
| Concatenation (.) | Concatenation of strings of two regular expressions | $A.B = \{ac, ad, bc, bd\}$ |

| Application layer | Entry point of attack | Regular expression |
|---|---|---|
| Abuse of privileges and authority | Malicious third party apps | $ch_i$(install malicious app). $ch_n$(gain control over tenant controller VM). {$ch_j$(disconnect sensitive apps) + $ch_k$(shutdown sensitive apps)}. {$ch_l$(crash network) + $ch_m$(degrade network performance)} |
| Service disruption | Malware | $ch_i$(install malicious app). $ch_j$(gain control over tenant controller VM). [{$ch_1$(drop control messages to VNFs) + $ch_2$(subvert order in which app handlers access control packets) + $ch_3$(interfere in service chain)}. $ch_k$(disrupt control packet forwarding) + $ch_4$(eavesdrop on control messages). $ch_l$(derive topology of network). $ch_m$(execute topology based attacks)]. {$ch_o$(crash network) + $ch_p$(degrade network performance)} |
| Application shutdown | Vulnerable northbound API | $ch_i$(exploit vulnerability in northbound API). {$ch_j$(issue system command). $ch_k$(terminate victim app) + $ch_l$(eavesdrop on messages between controller and app)} |
| Control layer | | |
| Dynamic flow rule tunneling | Malware & vulnerable switches | $ch_i$(install malicious app). $ch_j$(instruct conflicting/overlapping flow rules). $ch_k$(bypass sensitive VNFs like firewall/Intrusion Detection Systems (IDS)). {$ch_l$(degrade performance) + $ch_m$(crash network + $ch_n$(DoS attach)} |
| Controller poisoning (Poisoned network view) | Malware & vulnerable network services and protocols | $ch_i$(gain access to controller VM). {$ch_j$(send crafted LLDP packets). $ch_k$(poison network topology in controller by adding fake connections). $ch_l$(drop packets in data plane). $ch_m$(degrade performance) + $ch_n$(poison controller host profile reservoir). $ch_o$(install malicious VM). $ch_p$(redirect data packets to malicious VM). $ch_q$(MiTM attack in data plane)} |

*FIG. 6(a)*

| | | |
|---|---|---|
| NOS misuse | Vulnerable controller | {$ch_i$(malicious apps running at Application layer) + $ch_j$(rogue switch VM)}. (multiple attacks that are denoted in cells below) |
| | | $ch_k$(execute system commands). $ch_l$(terminate controller). $ch_m$(degrade network performance) |
| | | $ch_k$(access sensitive network information). $ch_l$(execute deviant actions) |
| | | $ch_k$(modify flow rules). {$ch_l$(eavesdrop on data plane packets) + $ch_m$(redirect data packets)}. {$ch_n$(degrade network performance) + $ch_o$(MiTM attack in data plane) + $ch_p$(bypass security functions like firewalls/IDS)} |
| | | $ch_k$(install rootkits) |
| | | $ch_k$(hijack network policy database) |
| | | $ch_k$(input invalid input data). $ch_l$(send controller in an invalid state). $ch_m$(degrade network performance) |
| Packet-in-flooding | Faulty controller or compromised switch VMs | {$ch_i$(malicious app) + $ch_j$(malicious switch VM)}. $ch_k$(send massive amounts of malformed packets). $ch_l$(switch-table misses of switch VM). $ch_m$(massive amount of packet-in messages sent to controller VM). $ch_o$(DoS attack on controller). $ch_p$(degrade network performance) |
| Switch table flooding | Faulty controller or compromised switch VMs | {$ch_i$(malicious app) + $ch_j$(malicious switch VM)}. $ch_k$(send massive amount of 'features-reply' messages to controller). $ch_l$(fill controller switch table with fake switches). $ch_m$(DoS attack on controller). $ch_n$(degrade network performance) |
| Legitimate switch id hijacking | | $ch_i$(malicious switch VM installed). $ch_j$(connect malicious VM to controller using DPIP of target VM). $ch_k$(legitamate VM gets disconnected). {$ch_l$(network crash) + $ch_m$(degrade network performance)} |

*FIG. 6(b)*

| | | |
|---|---|---|
| Spanning tree poisoning | | $ch_i$(send crafted LLDP packets to controller VM). $ch_j$(poison spanning tree protocol with targetted fake links). $ch_k$(disconnect targetted links). {$ch_l$(network crash) + $ch_m$(degrade network performance)} |
| Control Channel (CC) | | |
| Passive MiTM | Unencrypted messages | $ch_i$(absence of crypto in CC). $ch_j$(sniff packets on CC). {$ch_k$(eavesdrop on control messages) + $ch_l$(eavesdrop on topology information) + $ch_m$(eavesdrop on management info)} |
| Active MiTM | Compromised southbound interface or vulnerable data links | $ch_i$(absence of crypto in CC). $ch_j$(ARP poisoning). $ch_k$(insert intruder host between controller and data plane) |
| Infrastructure layer | | |
| DoS leveraging ARP poisoning | | $ch_i$(ARP poisoning). $ch_j$(impersonate controller VM). $ch_k$(connect fake controller to target switch). $ch_l$(disconnect target switch VM from network). $ch_m$(degrade network performance) |
| Flow-rule flushing/modification | | {$ch_i$(malicious app) + $ch_j$(install malware on controller VM + $ch_o$(gain access to controller VM)}. $ch_k$(send incorrect control messages to switches). {$ch_l$(modify switch flow rules) + $ch_m$(flush switch flow rules)}. $ch_n$(degrade network performance) |
| Flow-rule flooding | Side-channel attack (SCA) | $ch_i$(record round-trip time of packets;SCA). $ch_j$(detect VM that has an almost full switch-table). $ch_k$(detect types of packets causing table misses). $ch_l$(send such packets repeatedly). $ch_m$(flood switch table of VM). $ch_n$(degrade network performance) |

*FIG. 6(c)*

| Topology-based attacks | Regular expression |
|---|---|
| Adding unauthorized connection in VNF | $ch_i$(modify VNF instantiation). $ch_j$(add unauthorized connection in VNF). $ch_k$(exploit weak crypto implementations). {$ch_l$(eavesdrop on packets) + $ch_o$(add a loop in network). $ch_p$(orchestrator creates new instances of VMs (to handle excess load). $ch_q$(DoS on NFV infrastructure)} |
| Modifying firewall/IDS instantiation | $ch_i$(modify VNF instantiation). $ch_j$(modify rules in firewall virtual storage). $ch_k$(connect to malicious website) + $ch_l$(modify IDS rules). {$ch_m$(flood network with incoming malicious traffic). $ch_p$(orchestrator creates new instances of VMs (to handle excess load)). $ch_q$(DoS on NFV infrastructure) + $ch_m$(flood network with incoming DNS queries). $ch_p$(orchestrator creates new virtual DNS). $ch_q$(amplified DNS query request - DoS attack on victim)} |
| Passive MiTM | {$ch_i$(modify VNF instantiation). $ch_m$(add a link to malicious VM) + $ch_j$(physical access of interfaces)}. $ch_k$(eavesdrop on the messages being sent). $ch_l$(infer topology of network) |
| Active MiTM | $ch_o$(physical access to interface). $ch_i$(exploit weak crypto implementations). $ch_j$(modify packets in-transit). $ch_k$(crash the system) + $ch_l$(replay packets). $ch_m$(orchestrator creates new instances of VMs (to handle excess load)). $ch_n$(DoS on NFV infrastructure) |
| Exploiting Lights out Management (LOM) | |
| DoS attack on management network | $ch_i$(identify network port(s) having access to LOM). $ch_j$(flood the port with requests). $ch_k$(DoX attack on LOM port(s)) |
| Exploiting LOM network | {$ch_i$(SQL injection attack on virtual storage) + $ch_j$(SCA by physical access) + $ch_k$(cache poisoning attack) + $ch_l$(download unwhitelisted software). $ch_m$(gain control over hypervisor) + $ch_n$(dynamic memory overflow of hypervisor). $ch_o$(overwrite frame pointer of hypervisor). $ch_p$(code injection in hypervisor)}. $ch_q$(read secret LOM credentials). {$ch_r$(crash the system) + $ch_s$(modify critical files on virtual storage) + $ch_t$(modify critical code on virtual compute)} |
| Exploiting hypervisor dependency on VNF (1) | $ch_i$(network fails). $ch_j$(hypervisor fails). $ch_k$(hypervisor requests network configuration from VM running on top of it). {$ch_l$(VM crashed; depends on hypervisor2 which has also crashed) + $ch_m$(crashed VM depends on hypervisor). $ch_n$(VM fails to boot). $ch_o$(DoS on hypervisor) |

*FIG. 9(a)*

| | |
|---|---|
| Exploiting hypervisor dependency on VNF (2) | $ch_i$(network failure). $ch_j$(virtual forwarding function1 (VFF1) starts to boot). $ch_k$(requests access to VFF2). $ch_l$(VFF2 is crashed). $ch_m$(VFF2 requests access to VFF1). $ch_n$(deadlock arises, DoS on VFF1). $ch_o$(DoS on VFF2). |
| Exploiting insecure boot | $ch_i$(absence of secured boot authentication). $ch_j$(steal secret keys) + $ch_k$(rootkit injection + $ch_p$(reset configuration). $ch_l$(hypervisor compromise) + $ch_m$(VM compromise) + $ch_n$(orchestrator compromise) + $ch_o$(VM manager compromise) |
| Insecure Crash | |
| Comprising sensitive data | $ch_i$(VM/VNF crashes). {$ch_j$(local memory not cleared by hypervisor) + $ch_o$(remote memory not cleared by hypervisor)}. $ch_k$(new VM gets assigned same memory addresses as crashed VM). $ch_l$(new VM gets access to sensitive data) + $ch_m$(new VM gets access to keys). $ch_n$(new VM implements privilege escalation) |
| Exploiting absence of safety measures | $ch_i$(application within VM crashes but VM is still functional). $ch_j$(hypervisor resets/changes existing authorizations). $ch_k$(VM is restricted from performing required functions). $ch_l$(network crashes) |
| Privilege escalation | $ch_i$(VM$_i$ crashes). $ch_j$(memory and authorizations are not cleared by hypervisor). $ch_k$(VM$_j$ gets assigned the same memory location as crashed instance of VM$_i$). $ch_l$(VM$_j$ gets same privileges as VM$_i$) |
| Authentication, Authorization, Accounting (AAA) attacks (s) | $ch_i$(weak authentication on NFVI manager). $ch_j$(access to hypervisor). $ch_k$(access to physical storage, compute and network). {$ch_l$(get secret keys) + $ch_m$(MiTM attacks) + $ch_n$(replay attacks) + $ch_o$(eavesdrop on communication) + $ch_p$(modify packets in-transit) + $ch_q$(assign low memory to VMs). $ch_r$(DoS on VMs) + $ch_s$(give unauthorized privileges to malicious actors) + $ch_t$(download unwhitelisted malware) + $ch_u$(add unauthorized connections)} |
| AAA attacks (2) | $ch_i$(weak authorization of hypervisor) + $ch_j$(weak authorization of orchestrator) + $ch_k$(weak authorization of VM) + $ch_l$(weak authorization of VNF managers) |
| Exploiting backdoors meant for testing | $ch_i$(virtualized switch in promiscuous mode). {$ch_j$(eavesdrop on VNF traffic with test process) + $ch_k$(adversary sends malicious traffic through test backdoor) + $ch_l$(shared memory access to test process)}. {$ch_m$(eavesdrop on sensitive data/secret keys) + $ch_n$(modify sensitive data of VNF in test/monitoring mode)} |

*FIG. 9(b)*

| Flooding attacks | $ch_i$(physical access to shared network recourse). {$ch_j$(flood shared network with requests) + $ch_k$(flood shared network with high-priority messages)}. $ch_l$(DoS attack on target VM) |
|---|---|
| Eavesdropping on shared resources | {$ch_g$(virtual sharing of same network slice + $ch_h$(physical sharing of same network component)}. $ch_i$(eavesdrop on shared renounces). $ch_j$(absence of crypto on control plane). $ch_j$(reverse engineer the packets sent by target VM). $ch_k$(spoof target VM.) {$ch_m$(send modified packets with target VM id) + $ch_n$(request access to other VMs with target VM's id). $ch_o$(target VM is disconnected from these VMs in the virtual network). $ch_p$(replay packets received by target VM)}. {$ch_q$(crash the system) + $ch_r$(launch DoS attack on another VM through target VM)} |
| SCA/Cache poisoning | $ch_i$(SCA analysis) + $ch_j$(cache poisoning). $ch_k$(extract crypto keys) |
| Resources of virtual infrastructure | |
| Local storage attacks | $ch_i$(install malware at hypervisor level). $ch_j$(force hypervisor to fill up local storage with log). $ch_k$(local storage insufficient for VMs). {$ch_l$(degrade network performance) + $ch_m$(DoS attack on VMs)} |
| Remote attacks | $ch_i$(install malware at hypervisor level). {$ch_j$(force hpervisor to fill up remote storage with logs). $ch_k$(remote storage insuffiencient for VMs) + $ch_n$(remote control channel degrataion)}. {$ch_l$(degrade network performance) + $ch_m$(DoS attack on VMs)} |
| Memory pressure attacks | $ch_i$(install malware at hypervisor level). $ch_j$(consume kernel memory). {$ch_l$(degrade network performance) + $ch_m$(crash the system)} |
| CPU attacks | $ch_i$(install malware at hypervisor level). $ch_j$(cause scheduler unfairness). {$ch_l$(degrade network performance) + $ch_m$(crash the system)} |
| OS resource exhaustion | $ch_i$(install malware at hypervisor level). {$ch_j$(consume file handles). + $ch_n$(consume event channels)}.+ $ch_o$(insufficient resources for OS). {$ch_l$(degrade network performance) + $ch_m$(crash the system)} |

*FIG. 9(c)*

| Graph | Number of Attack Vectors |
|---|---|
| SDN-CP | 14 |
| SDN-DP | 25 |
| NFV | 25 |
| Malicious Peripheral | 49 |
| Total | 113 |

*FIG. 12*

| Category | Novel Possible Exploit |
|---|---|
| SDN-CP | Drop control messages to VNFs → Disconnect targeted links in the network |
| SDN-DP | Gain control of tenant controller VM → Hijack network policy database |
| NFV | Install a malicious switch → Modify critical files on virtual storage or virtual compute |
| SDN-CP, SDN-DP | Hijack northbound API → Input invalid data to tenant controller, forcing it to go to an invalid state |
| NFV, SDN-CP | Exploit backdoors for testing → Poison tenant controller host profile reservoir |
| SDN-DP, NFV | Flood the switch table of target virtual switch → Exploit the insecure crash recovery of NFV to shut down new VNFs assigned the same memory as the crashed VNF |
| Malicious peripheral, SDN-DP | Compromise NFV-MANO unit → Issue system command to terminate controller |
| Malicious peripheral, NFV | Connect malicious peripheral and exploit MSI vulnerabilities → Gain hypervisor privilege |

*FIG. 13*

| Category | Number of Novel Possible Exploits |
|---|---|
| SDN-CP | 36 |
| SDN-DP | 23 |
| NFV | 36 |
| Malicious Peripheral | 0 |
| Inter-graph | 24 |
| Total | 119 |

*FIG. 14*

| Feature | Install Malicious Apps | Assign Low Memory to VM |
|---|---|---|
| Application Layer | 1 | 0 |
| Controller | 0 | 0 |
| Application-controller Interface | 0 | 0 |
| VNF | 0 | 1 |
| Network Infrastructure | 0 | 1 |
| Management Layer | 0 | 1 |
| Hypervisor | 0 | 1 |
| Flooding | 0 | 1 |
| Access Control | 0 | 0 |
| Data Plane | 0 | 0 |
| SCA | 0 | 0 |
| Control Channel | 0 | 0 |
| Sensitive Information | 0 | 0 |
| SDN-CP | 1 | 0 |
| SDN-DP | 1 | 0 |
| NFV | 0 | 1 |
| Malicious Peripheral | 0 | 0 |
| Head | 1 | 0 |
| Tail | 0 | 0 |

*FIG. 15*

| Graph | Training Set | Training Set |
|---|---|---|
| SDN-CP | 552 | 98 |
| SDN-DP | 898 | 159 |
| NFV | 510 | 90 |
| Malicious Peripherals | 690 | 122 |
| Inter-graph Connections | 6548 | 1156 |
| Total | 9198 | 1625 |

| Algorithm | SDN-CP | SDN-DP | NFV | Malicious Peripherals | Intergraph |
|---|---|---|---|---|---|
| Naive Bayes | 94.44 | 94.91 | 89.8 | 97.44 | 100 |
| Decision Tree | 90.7 | 94.63 | 89.02 | 98.26 | 99.74 |
| k-NN (k=3) | 87.76 | 93.67 | 87.64 | 97.54 | 100 |
| SVM | 93.33 | 95.65 | 91.38 | 98.86 | 99.74 |
| Neural Network | 95.0 | 96.9 | 91.67 | 98.98 | 99.82 |
| CSP | 94.38 | 96.69 | 95.12 | 98.35 | 99.65 |

*FIG. 18*

| Graph | Algorithm |
|---|---|
| SDN-CP | MLP (6,2) |
| SDN-DP | MLP (8,2) |
| NFV | CSP |
| Malicious Peripherals | MLP (5,2) |
| Inter-graph | MLP (5,2) |

*FIG. 19*

|  | Actual = True | Actual = True | Sums |
|---|---|---|---|
| Predicted = True | 26 | 67 | 93 |
| Predicted = False | 15 | 1517 | 1532 |
| Sums | 41 | 1584 | 1625 |

*FIG. 20*

| Metric | Value |
|---|---|
| NPV | 0.99 |
| Precision | 0.28 |
| Recall | 0.63 |
| F1 Score | 0.36 |
| MCC | 0.4 |
| Accuracy | 0.95 |

*FIG. 21*

| Compromised Element | S1 | S2 | A1 | A2 | A3 | A4 | A5 | A6 | A7 |
|---|---|---|---|---|---|---|---|---|---|
| AUSF-ARPF channel; Passive MiTM | ✓ | ✗ | ✗ | ✗ | ✓ | ✓ | ✗ | ✗ | ✗ |
| AUSF-ARPF channel; Active MiTM | ✓ | ✗ | ✗ | ✗ | ✓ | ✗ | ✗ | ✗ | ✗ |
| SEAF | ✓ | ✗ | ✗ | ✗ | ✗ | ✓ | ✗ | ✗ | ✗ |
| AUSF | ✓ | ✗ | ✗ | ✗ | ✗ | ✓ | ✗ | ✗ | ✗ |
| ARPF | ✓ | ✗ | ✗ | ✗ | ✓ | ✗ | ✗ | ✗ | ✗ |

*FIG. 24*

SYSTEM AND METHOD FOR MACHINE LEARNING ASSISTED SECURITY ANALYSIS OF 5G NETWORK CONNECTED SYSTEMS

CROSS-REFERENCE TO RELATED APPLICATIONS

This application claims priority to provisional application 63/111,306, filed Nov. 9, 2020, which is herein incorporated by reference in its entirety.

STATEMENT REGARDING FEDERALLY SPONSORED RESEARCH OR DEVELOPMENT

This invention was made with government support under Grant No. CNS-1617628 awarded by the National Science Foundation. The government has certain rights in the invention.

FIELD OF THE INVENTION

The present invention relates generally to security analysis of 5G networks and more particularly to systems and methods for a machine learning based framework for discovering vulnerabilities in a 5GCN by creating and analyzing attack graphs.

BACKGROUND OF THE INVENTION

Fifth generation (5G) networks hold promise for realizing the vision of universal connectivity. They enable various verticals like Internet-of-Things (IoT), autonomous vehicles, smart cities, and telemedicine. These applications require high-bandwidth, robust, flexible, dynamic, and fault-tolerant network architectures.

5G networks represent a huge leap, both qualitatively and quantitatively, from previous-generation telecommunication networks. The network core architecture has undergone a paradigm shift from its predecessor, the Evolved Packet Core. Previously, network functions were implemented on commodity hardware. In 5G networks, the network functions are mostly implemented in software. Moreover, with the advent of cloud computing, many network operations are now virtualized. This allows multiple operators to use the same underlying hardware resources to provide network services. This technology is broadly known as network function virtualization (NFV). 5G networks also separate the communication on the data plane from that on the control plane. This involves the use of a controller that observes the entire network before making routing decisions. This technology, broadly referred to as software-defined networking (SDN), has been shown to reduce both the operational expenditure (OPEX) and capital expenditure (CAPEX) of the network. Many of these transitions have become possible due to the utilization of an mm-wave technology in 5G. Incorporation of these new technologies results in significant improvements in efficiency, reliability, and flexibility of wireless networks.

The confluence of the new technologies makes the 5G core network (5GCN) an intricate system including software-defined networking (SDN), network function virtualization (NFV), distributed systems, and cloud computing. The 5GCN has a service-based architecture that dynamically modifies itself according to the requirements of the operators and users. However, introduction of new technologies into the 5GCN also expands its attack surface, as it now inherits the vulnerabilities of all these individual technologies.

Security and privacy of users are of prime importance in 5G networks. The Third Generation Partnership Project (3GPP) has been working continuously to define the security standards of 5G communication systems. Multiple versions of security standards have been published to date. Recent surveys and articles list the potential vulnerabilities of various 5G-enabling technologies like cloud radio access networks, SDN, NFV, network slicing, cloud computing, and multi-edge computing.

There are many vulnerabilities that exist in the SDN ecosystem. Multiple implementation vulnerabilities exist in various open-source SDN controllers and network operating systems (NOSs) like OpenFlow, POX, and Open-Daylight. Similarly, network slicing and NFV have their own vulnerabilities. NFV inherits many of its vulnerabilities from traditional virtualization technologies. However, prior work does not report on the specific attack vectors that can exploit these vulnerabilities in the 5G framework and lacks detailed analyses of the impact of these vulnerabilities on the end-user. No prior work appears to explore interactions among vulnerabilities of different technologies, like SDN and NFV, to generate complex attack vectors.

Attack graphs can be used to analyze 5GCN security. Attack graphs have found extensive use in network security, software, and electronic systems. Various vulnerability assessment tools have been developed to analyze the security of software systems and networks using attack graphs. Some of the popular ones are MulVal and A2G2V. However, these tools do not address discovery of unique vulnerability exploits in a software-defined and virtualized network.

The 5G ecosystem includes multiple protocols executing at different layers. Many vulnerabilities have been detected in various 5G protocols like cellular paging protocols, multiple control layer protocols, and cellular access network protocols. The 5G-AKA protocol claims to provide higher security than its predecessors because it provides enhanced user identity protection, more sophisticated key derivation, and an increased influence of the home network in authentication. However, the increased complexity of the 5G-AKA protocol leads to new vulnerabilities.

SUMMARY OF THE INVENTION

According to various embodiments, a method for detecting security vulnerabilities in a fifth generation core network (5GCN) is disclosed. The method includes constructing an attack graph from a plurality of regular expressions. Each regular expression corresponds to a sequence of system level operations for a known 5GCN attack. The attack graph includes a plurality of nodes and a plurality of paths. Each node represents a system-level operation of the 5GCN and each path represents a 5GCN attack vector. The method further includes performing a linear search on the attack graph to determine unexploited 5GCN attack vectors where path in the attack graph that does not represent a known 5GCN attack vector represents an unexploited 5GCN attack vector. The method also includes applying a trained machine learning module to the attack graph to predict new 5GCN attacks. The trained machine learning module is configured to determine a feasibility of linking unconnected nodes in the attack graph to create a new branch representing a new 5GCN vulnerability exploit.

According to various embodiments, a system for detecting security vulnerabilities in a fifth generation core network (5GCN) is disclosed. The system includes one or more processors configured to construct an attack graph from a plurality of regular expressions. Each regular expression corresponds to a sequence of system level operations for a known 5GCN attack. The attack graph includes a plurality of nodes and a plurality of paths. Each node represents a system-level operation of the 5GCN and each path represents a 5GCN attack vector. The processors are further configured to perform a linear search on the attack graph determine unexploited 5GCN attack vectors, where a path in the attack graph that does not represent a known 5GCN attack vector represents an unexploited 5GCN attack vector. The processors are also configured to apply a trained machine learning module to the attack graph to predict new 5GCN attacks. The trained machine learning module is configured to determine a feasibility of linking unconnected nodes in the attack graph to create a new branch representing a new 5GCN vulnerability exploit.

According to various embodiments, a non-transitory computer-readable medium having stored thereon a computer program for execution by a processor configured to perform a method for detecting security vulnerabilities in a fifth generation core network (5GCN) is disclosed. The method includes constructing an attack graph from a plurality of regular expressions. Each regular expression corresponds to a sequence of system level operations for a known 5GCN attack. The attack graph includes a plurality of nodes and a plurality of paths. Each node represents a system-level operation of the 5GCN and each path represents a 5GCN attack vector. The method further includes performing a linear search on the attack graph to determine unexploited 5GCN attack vectors where path in the attack graph that does not represent a known 5GCN attack vector represents an unexploited 5GCN attack vector. The method also includes applying a trained machine learning module to the attack graph to predict new 5GCN attacks. The trained machine learning module is configured to determine a feasibility of linking unconnected nodes in the attack graph to create a new branch representing a new 5GCN vulnerability exploit.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIGS. 6(a)-(c) depict a table of regular expressions for SDN attacks according to an embodiment of the present invention;

FIGS. 9(a)-(c) depict a table of regular expressions of NFV threat vectors mentioned in standards document ETSI_GS_NFV-SEC_001_v1.1.1 according to an embodiment of the present invention;

FIG. 12 depicts a table of summary of attacks in the attack graphs according to an embodiment of the present invention;

FIG. 13 depicts a table of category-wise examples of novel possible exploits according to an embodiment of the present invention;

FIG. 14 depicts a table of a number of novel possible exploits per category according to an embodiment of the present invention;

FIG. 15 depicts a table of node features according to an embodiment of the present invention;

FIG. 18 depicts a table of NPV (in %) of ML/CSP models according to an embodiment of the present invention;

FIG. 19 depicts a table of the final ensemble model according to an embodiment of the present invention;

FIG. 20 depicts a table of a confusion matrix of the final ensemble model according to an embodiment of the present invention;

FIG. 21 depicts a table of performance metrics of the final ensemble model on the test set according to an embodiment of the present invention;

FIG. 24 depicts a table of property satisfaction under compromised channels and components according to an embodiment of the present invention.

DETAILED DESCRIPTION OF THE INVENTION

Figure 1:
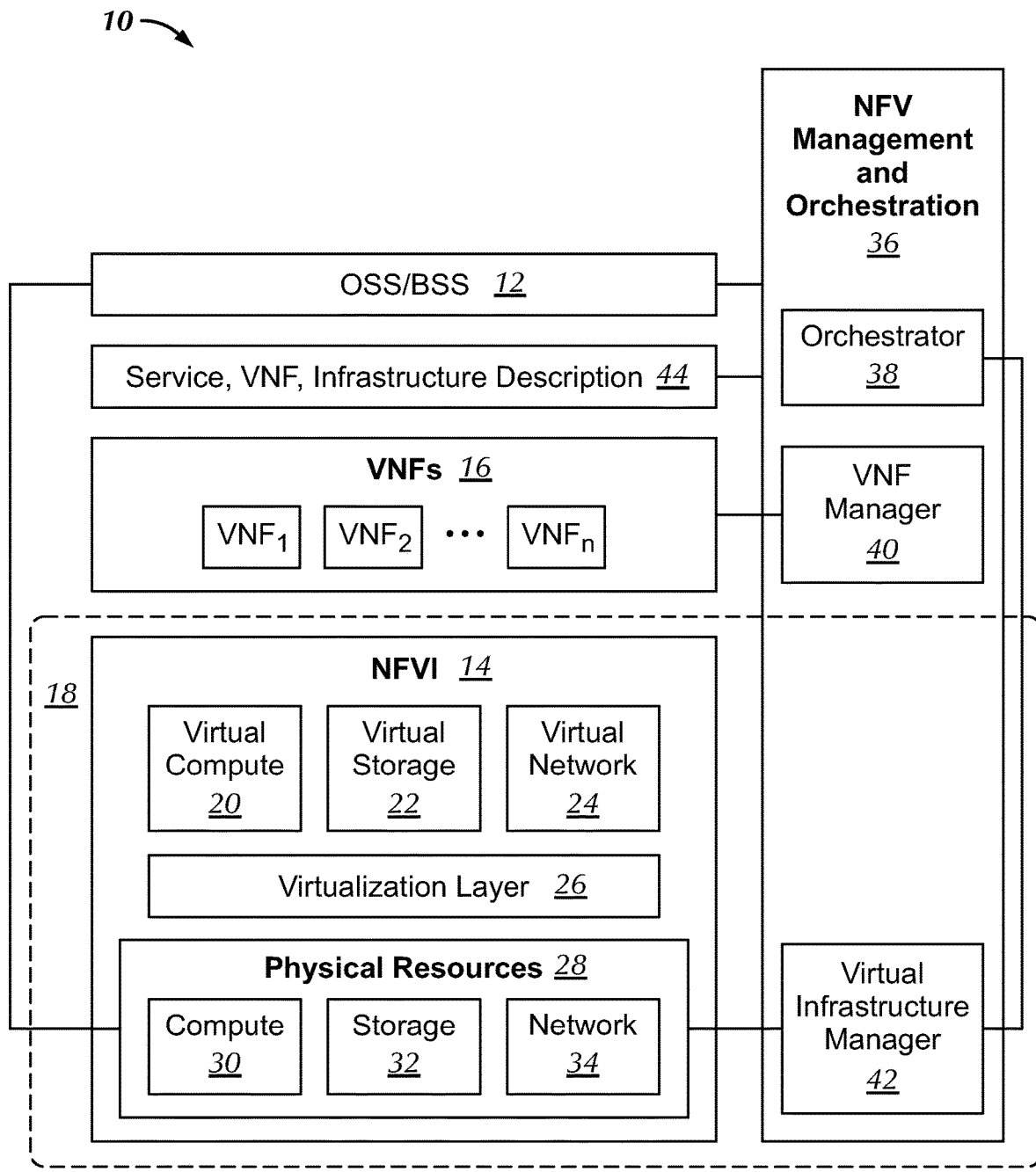
FIG. 1 depicts a NFV reference architecture according to an embodiment of the present invention.

The core network architecture of telecommunication systems has undergone a paradigm shift in fifth generation (5G) networks. 5G networks have transitioned to software-defined infrastructures, thereby reducing their dependence on hardware-based network functions. New technologies, like network function virtualization and software-defined networking, have been incorporated in the 5G core network (5GCN) architecture to enable this transition. This has resulted in significant improvements in efficiency, performance, and robustness of the networks. However, this has also made the core network more vulnerable, as software systems are generally easier to compromise than hardware systems.

Generally disclosed herein are embodiments for a comprehensive security analysis framework for the 5GCN. A novelty of this approach lies in the creation and analysis of attack graphs of the software-defined and virtualized 5GCN through machine learning. This analysis was able to determine 119 novel possible exploits in the 5GCN. These possible exploits of 5GCN vulnerabilities can generate five novel attacks on the 5G Authentication and Key Agreement protocol. The attacks at the network, protocol, and the application layers are thus combined to generate complex attack vectors. In a case study, these attack vectors are used to find four novel security loopholes in WhatsApp running on a 5G network.

Prior work in 5G security has referred to broad categories of attacks to which the 5GCN may be vulnerable. Disclosed herein are far-reaching implications of these threats and how they may interact with each other to give rise to complex attacks that were infeasible in previous generations of telecommunication networks. The sequences of operations that are executed to implement an attack, also referred to as attack vectors, can be combined into an attack graph for a concise representation. The various attack vectors pertaining to SDN, NFV, and 5G protocols are combined into attack graphs. These graphs are analyzed to generate 119 novel possible exploits that are exclusive to 5G networks. They are possible exploits in a specific system. The numerous vulnerabilities arising due to implementation errors are generally system specific. It is shown how these possible exploits can compromise the 5G Authentication and Key Agreement (AKA) protocol. Five new attack vectors are discovered in the 5G-AKA protocol that can be triggered by 5GCN vulnerabilities. It is demonstrated how various attacks at the network and protocol levels can be combined to remotely hack targeted end-user applications.

In a case study, the hacking of the WhatsApp account of an end user is demonstrated. WhatsApp was chosen as the target application because it is the most widely used instant messaging (IM) platform and possesses some of the most advanced security features. Four security loopholes were discovered that may be triggered in WhatsApp in the absence of appropriate 5GCN security measures.

It is shown how the framework generally disclosed herein can scale to larger infrastructures through the use of machine learning (ML) and a constraint satisfaction problem (CSP) formulation. ML and CSP formulation are used at the system level to predict possible vulnerability exploits when a new node is added to the attack graphs. A new node may be added when a new vulnerability is discovered or when a new vulnerable component is introduced in the 5GCN. Utilization of ML at the system level is inspired by the SHARKS framework, where ML was used to discover novel possible exploits in an IoT system. SHARKS is an acronym for Smart Hacking Approaches for Risk Scanning and is generally described in PCT Publication No. WO 2020/219157, which is hereby incorporated by reference in its entirety. Although SHARKS was originally targeted at IoT and cyberphysical systems, it is also applicable to the 5GCN architecture, to be described further below.

System Overview

The vulnerabilities of various disruptive technologies like NFV, SDN, and network slicing are analyzed herein. This section provides a brief description of these concepts and introduces some of the techniques used to analyze system security.

NFV:

A network comprises various network functions (NFs) like gateways, load balancers, and firewalls. In traditional networks, these NFs are implemented on proprietary hardware systems. Such systems are not flexible and incur high maintenance costs because they are vendor proprietary. Moreover, they often remain underutilized. These issues prevent network operators from improving their average revenue per user (ARPU). NFV provides a way to increase ARPU by reducing network CAPEX and OPEX.

NFV abstracts out lower-level NF details by implementing NFs on virtual machines (VMs). This facilitates easier adoption of NFs by various applications. In addition, the virtual network functions (VNFs) provide higher flexibility and higher resource utilization. Any network function (such as but not limited to routers, domain name service, firewalls, caching, and network address translation) when implemented through software is referred to as a VNF. Some nonlimiting categorical examples of VNFs are switching (e.g., BNG, CG-NAT, routers), tunnelling gateway elements (e.g., IPSec/SSL VPN gateways), traffic analysis (e.g., DPI, QoE measurement), signaling (e.g., SBCs, IMS), application-level optimization (e.g., CDNs, load balancers), home routers and set top boxes, mobile network nodes (e.g., HLR/HSS, MME, SGSN, GGSN/PDN-GW, RNC), network-wide functions (e.g., AAA servers policy control, charging platforms), and security functions (e.g., firewalls, intrusion detection systems, virus scanners, spam protection).

An NFV architecture 10 is shown in FIG. 1. In this figure, every layer interacts only with the layers directly above and below it. The rest of the infrastructure is abstracted out. For example, the VNFs interact only with OSS/BSS above and virtual resources below. They do not need to interact directly with any other layer.

The various components of the NFV architecture 10 are as follows:

Operations Support System (OSS)/Business Support System (BSS) 12: This is responsible for various network management and operations functions like service provisioning and fault tolerance.

Network functions virtualization infrastructure (NFVI) 14: This is a distributed system of resources designed to provide a common platform to the VNFs 16. As shown in FIG. 1, the NFVI can be categorized into three classes: virtual resources 18 (including virtual computing 20, virtual storage 22, and virtual networking 24), a virtualization layer 26, and physical resources 28 (including physical computing 30, physical storage 32, and physical networking 34). The virtualization layer 26 acts as a bridge between the physical resources 28 and the virtual resources 18 by primarily managing allocation of physical resources 28 to virtual resources 18.

NFV Management and Network Orchestration (MANO) unit 36: This includes an NFV orchestrator 38, a VNF manager 40, and a virtual infrastructure manager (VIM) 42. The NFV orchestrator 38 plays an important role in instantiating the network. The VNF manager 40 is responsible for instantiating the VNFs 16. It manages various attributes of the VNFs 16 like their creation, migration, resource allocation, and termination. The VIM 42 is responsible for management and virtualization of the physical compute 30, storage 32, and network resources 34.

Service, VNF, Infrastructure Description 44: This dataset provides information regarding the VNF deployment template, VNF forwarding graph, service-related information, and NFV infrastructure information models. These templates/descriptors are used internally within the applicable functional block of NFV MANO 36, as needed.

All the components described above are provided by third-party vendors, unlike pre-5G networks where all components are proprietary. This makes these components inherently untrustworthy. Moreover, third-party software systems cannot be protected by hardware-based fingerprinting mechanisms like hardware root-of-trust and physical unclonable functions.

SDN:

Typically, network devices have their functionalities hard coded into the devices. This hinders flexibility and innovation in networks. SDNs ameliorate these issues, make virtualization of networks easier, and have the potential to increase the ARPU of network operators. The primary objective of software-defined networking is decoupling the control and data planes. SDNs have centralized controllers that make forwarding decisions for the switches. The controllers have a broad overview of the entire network, so they can make better decisions than localized switches.

Figure 2:
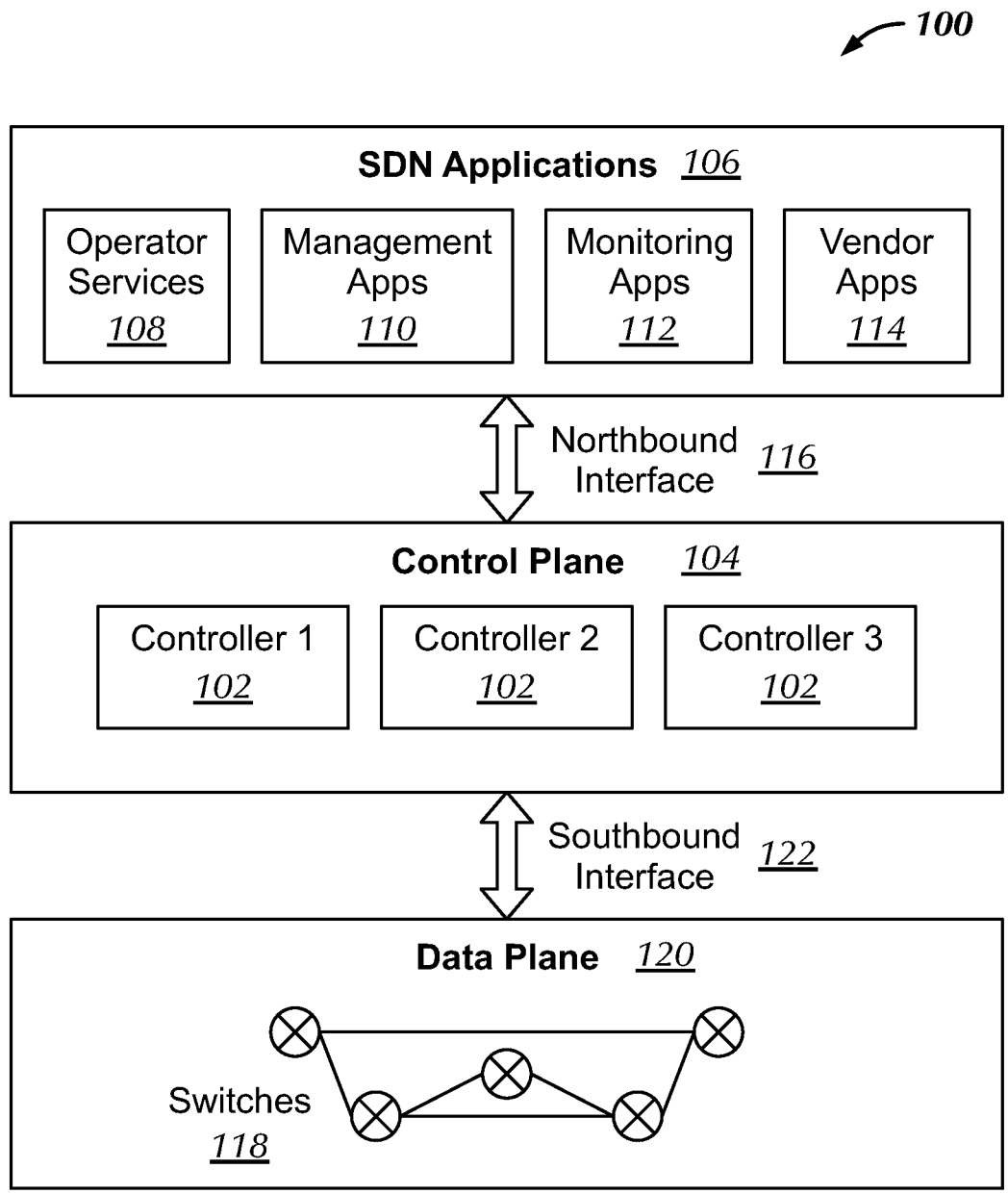
FIG. 2 depicts a SDN architecture according to an embodiment of the present invention.

An SDN architecture 100 is shown in FIG. 2. The logically centralized controllers 102 in the control plane 104 receive application requirements of SDN applications 106 (such as operator services 108, management aps 110, monitoring apps 112, and vendor apps 114) through the northbound interface 116. The controllers 102 are responsible for translating the application requirements into efficient flow rules. These rules are relayed to devices 118 of the data plane 120 via the southbound interface 122. The data plane 120 mainly includes forwarding devices like routers and switches. The data plane devices 118 communicate periodically with the controllers 102, updating the controllers 102 with the current situation in the data plane 120. This gives the controllers 102 a global view of the network, thus enabling the controllers 102 to make efficient forwarding decisions.

Various components of the SDN architecture 100, namely the control plane 104, data plane 120, northbound interface 116, and southbound interface 122, are prone to vulnerabilities.

Figure 3:
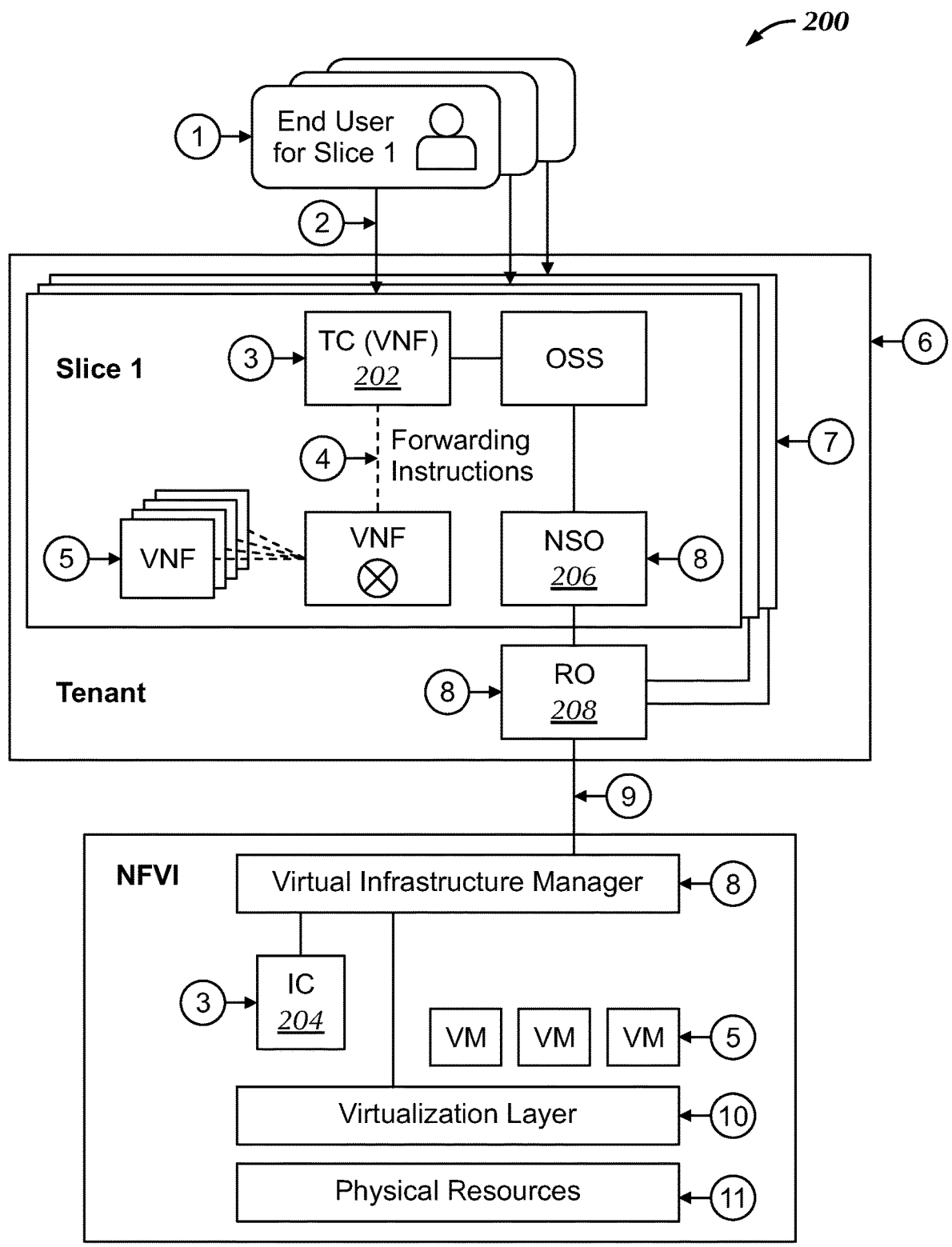
FIG. 3 depicts network slicing for 5G networks with SDN/NFV and its attack surface according to an embodiment of the present invention.

Network Slicing for 5G Networks with SDN/NFV:

Network slicing is an approach for sharing virtual network resources among multiple verticals. A network slice refers to an independent, end-to-end network composed of virtual resources. Network slicing enables the network operators to meet their ambitious goals, like scalability and low latency, by providing better network isolation and increased statistical multiplexing. A network slicing architecture 200 for the 5GCN is depicted in FIG. 3.

There are two kinds of resources available for sharing: NFs and the physical infrastructure. The NFs are provided to the operators by the tenants and the infrastructure by the infrastructure provider (InP). Virtualization and SDN are utilized at both the tenant and InP levels. The SDN controller at the tenant and InP levels are referred to as the tenant controller (TC) 202 and the infrastructure controller (IC) 204, respectively. A simplified example of the implementation of network slicing is depicted in FIG. 3. Every network slice has a network services orchestrator (NSO) 206 that communicates with the resource orchestrator (RO) 208 of the tenant. A tenant provides multiple slices to the operators. In the simplified example depicted in FIG. 3, the tenant is dependent on a single InP for its resources. In reality, the tenant may be dependent on multiple InPs. The network slicing architecture demonstrates how SDN and NFV are used together in the 5GCN.

Regular Expression:

Regular expression is a concise representation of a set of strings. Regular expressions are used to represent an attack vector. The set of all permissible characters in a regular expression is called its alphabet, denoted by $\Sigma$. The operations in regular expressions that are used herein are described in the table in FIG. 4. Regular expressions are generally used to denote system-level operations that are incomprehensible to humans.

The characters of the regular expression are defined herein at a higher granularity for the sake of generality. The alphabet ($\Sigma$) of the regular expressions here includes human-understandable system-level operations. For example, by $\Sigma=\{$'Install malicious switch,' 'Insert malware in hypervisor,' . . . ). This is done to ensure that application of the approach herein is independent of the application, OS, or the compiler employed by the 5GCN.

Methodology

This section describes the methodology and its impact for embodiments of the comprehensive security analysis framework for the 5GCN. The security of the software-defined and virtualized 5GCN are analyzed using ML and CSP formulation.

Attack Surface:

An attack surface of a system refers to the set of various entry points that can be exploited. The various components that compose the attack surface of the 5GCN are depicted in FIG. 3. They are as follows: 1) User applications; 2) Northbound interface of SDN controller; 3) SDN controller; 4) Control channel of SDN; 5) VNFs; 6) Tenant; 7) Network slice; 8) NFV MANO unit; 9) Management network between tenant and InP; 10) Hypervisor; 11) InP peripheral attacks, attacks on physical infrastructure. The attack vectors for exploiting vulnerabilities of these components are discussed in detail in the subsequent sections.

Attack Vector Representation:

Regular expressions and attack graphs are used to represent various attacks on the 5G system. Regular expressions are used because they allow for representing the sequence of exploits in an exploit chain. Attack graphs are used because they enable efficient modeling of the interactions between different threats. This section describes the process of constructing the attack graphs from various attacks. First, every attack is decomposed into a sequence of system level_operations. This sequence is represented using a regular expression. Then, this regular expression is converted into an attack graph. For example, consider an attack in which a target switch is disconnected from its SDN controller by poisoning the Address Resolution Protocol (ARP). This attack can be executed by the following sequence of system level operations: 1) Install a malicious VM in the system; 2) Launch an ARP poisoning attack to alter the MAC address of the controller on the target switch; 3) In the target switch memory, replace the MAC address of the original controller with that of the malicious VM; 4) The target switch is now disconnected from the controller; and 5) Send malicious flow rules to the switch from the malicious VM. This disrupts network functionalities.

Figures 4, 5:
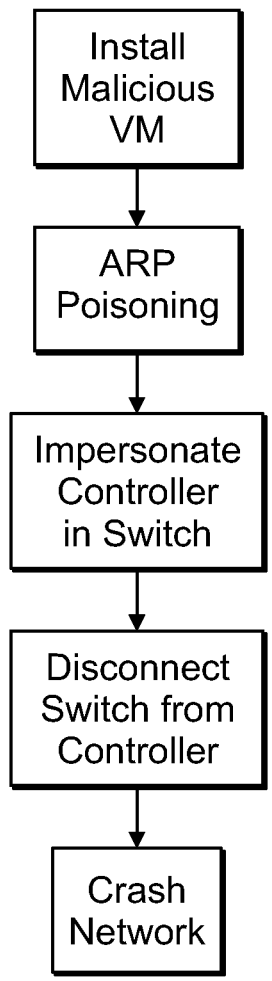
FIG. 4 depicts a table of basic operations in regular expressions according to an embodiment of the present invention.
FIG. 5 depicts a graph of tuning a regular expression into an execution graph according to an embodiment of the present invention.

Let ch denote a character from the alphabet $\Sigma$ of the regular expressions. Then, the regular expression of the attack vector described above can be represented as: $ch_i$ (Install malicious VM); $ch_j$(ARP poisoning); $ch_k$(Impersonate controller in switch); $ch_l$(Disconnect switch from controller); $ch_m$(Crash network). This regular expression can be converted into an execution graph, as shown in FIG. 5. The execution graphs of multiple attacks are combined to obtain the aggregated attack graphs.

5GCN Vulnerability Analysis:

This section describes the vulnerabilities of NFV, SDN, and peripheral devices, and the threats that arise from them. For each of these domains, regular expressions and attack graphs are used to conduct a complete security analysis of the system.

SDN Vulnerability Analysis:

SDN is one of the most disruptive technologies that is deployed in 5G systems. SDN implementation contains multiple vulnerabilities and is prone to exploits of varying complexity, including topology poisoning attacks, controller hijacking attacks, man-in-the-middle (MiTM) attacks, and denial-of-service (DoS) attacks, as nonlimiting examples. Moreover, popular open-source NOSs for the SDN controller, namely OpenFlow, OpenDaylight, and POX, have been shown to be vulnerable to multiple attacks.

SDN vulnerabilities can be broadly divided into two categories: control plane and data plane attacks. Control plane attacks involve compromising the NOS or the control channel that is used to send the control messages to the data plane devices. The communication in the control channel is generally unencrypted to enhance performance. This is a potential security loophole. An adversary with access to the control channel can possibly eavesdrop on the control messages to infer the network topology. Knowledge of the network topology can lead to a variety of attacks. Moreover, an adversary can compromise the integrity of the control messages without being detected. This can cause malicious network reconfiguration and DoS attacks. The data plane is also vulnerable to various attacks. The data plane attacks generally target individual switches and forwarding devices.

Figure 7A:
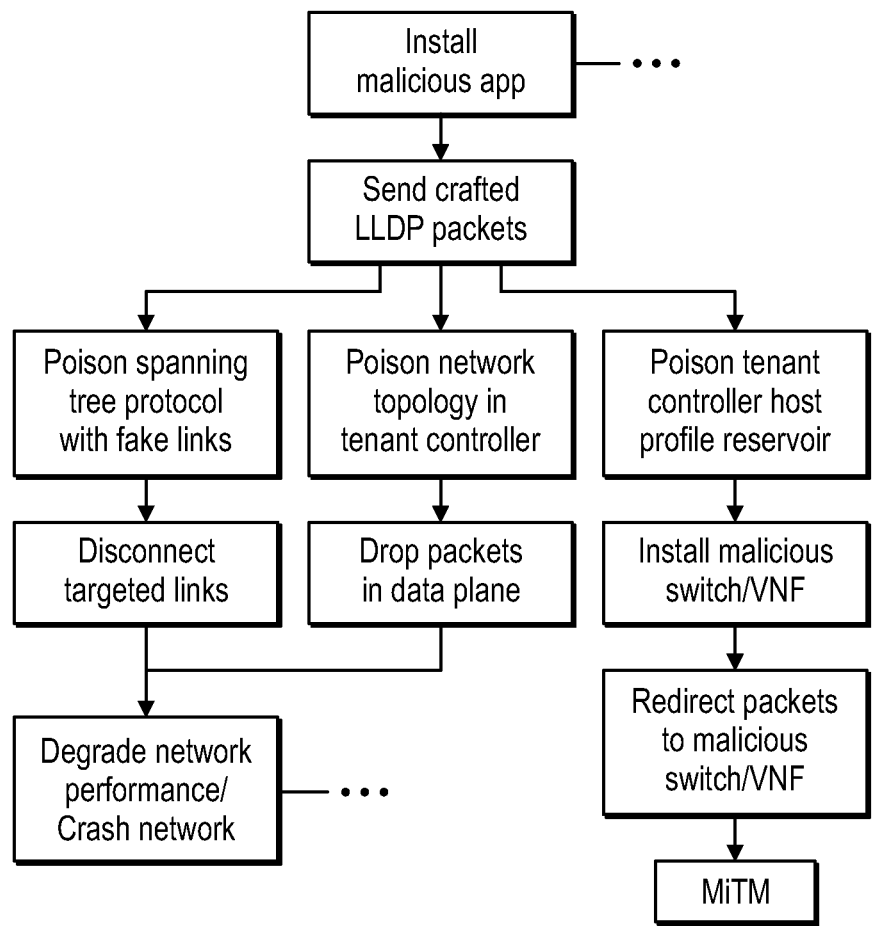
FIGS. 7(a)-(c) depict an aggregated attack graph of SDN control plane vulnerabilities according to an embodiment of the present invention.
Figure 7B:
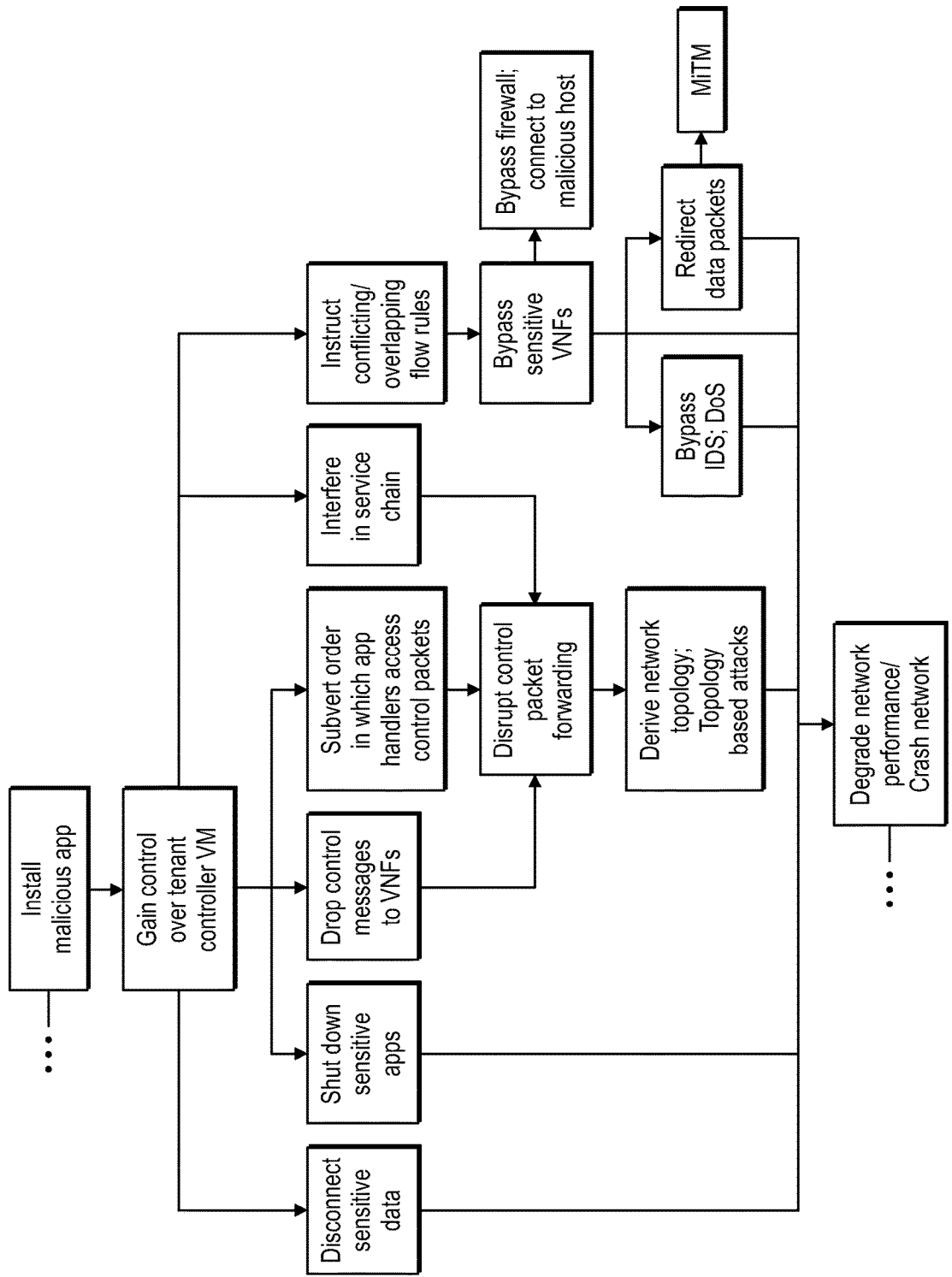
Figure 7C:
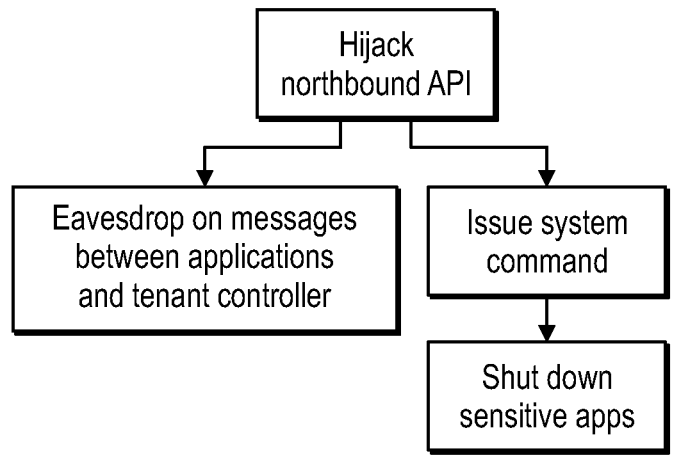

All SDN attack vectors are represented as regular expressions and then they are converted into attack graphs. The regular expressions of various SDN attacks are shown in the table in FIGS. 6(a)-(c). These attack vectors in the SDN control plane (SDN-CP) and the SDN data plane (SDN-DP) are then concisely represented as the attack graphs shown in FIGS. 7(a)-(c) and FIGS. 8(a)-(c), respectively. In an attack graph, every path from a head node to a tail node is a unique attack vector. The graph in FIGS. 7(a)-(c) has 14 unique SDN-CP attack vectors and the graph in FIGS. 8(a)-(c) has 25 unique SDN-DP attack vectors.

NFV Vulnerability Analysis:

NFV provides a dynamic and loosely coupled infrastructure that caters to a large diversity of user requirements. However, NFV inherits multiple implementation vulnerabilities and exploits thereof. Prior to NFV, when a proprietary function was introduced in the network, there existed an established trust between the developer and the operator. This trust is absent in an NFV-enabled network architecture because third-party VNFs are usually susceptible to a variety of threats, such as: 1) Generic networking threats; 2) Generic virtualization threats; and 3) Emerging threats due to a combination of networking and virtualization.

Due to multi-tenancy and Infrastructure-as-a-Service paradigms of virtualization, access to the core network is easier than before. This makes the 5GCN vulnerable to different kinds of attackers, some of whom may be end customers of retail networks, retail network operators, wholesale network operators, hypervisor operators, infrastructure sharers and operators, and facility managers. Hence, security monitoring should be an integral part of the 5GCN ecosystem.

Figure 10A:
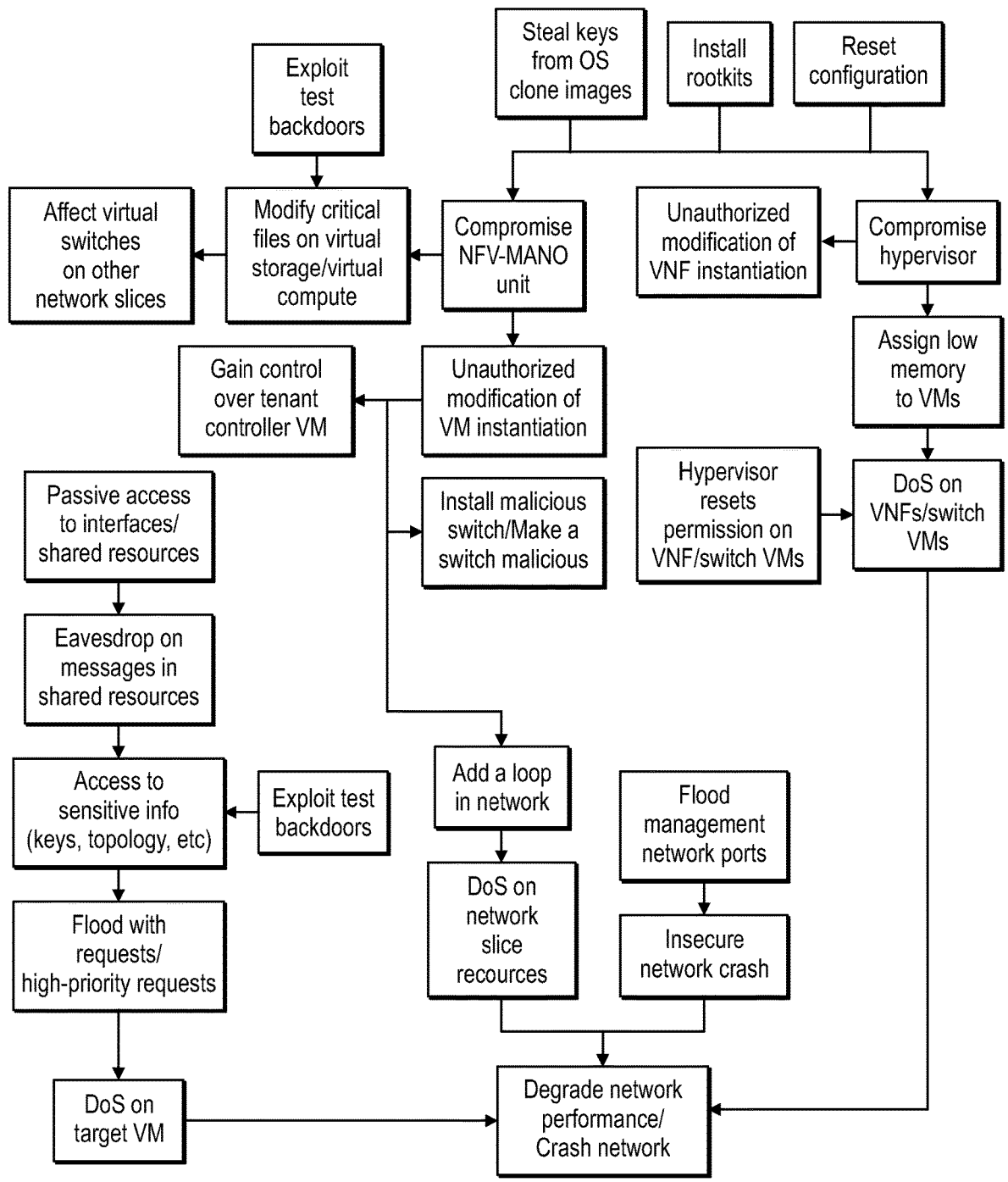
FIGS. 10(a)-(c) depict an aggregated attack graph of NFV vulnerabilities according to an embodiment of the present invention.
Figure 10B:
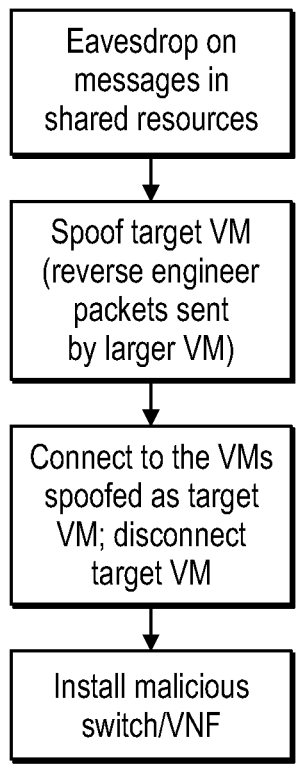
Figure 10C:
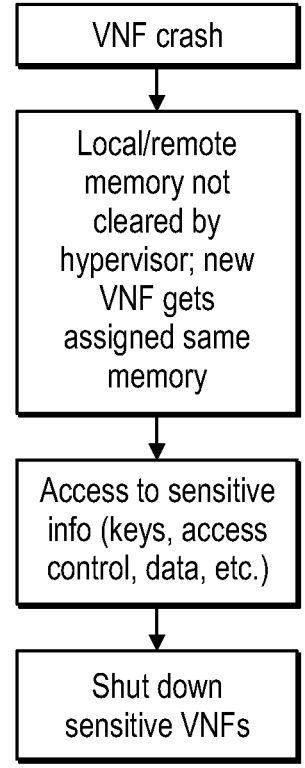

Regular expressions of the NFV threats and vulnerabilities are described in the table in FIGS. 9(a)-(c) and are concisely represented in the attack graph shown in FIGS. 10(a)-(c). The attack graph has 25 unique NFV attack vectors. These attack vectors have been constructed from the ETSI NFV security problem statement.

Figure 11A:
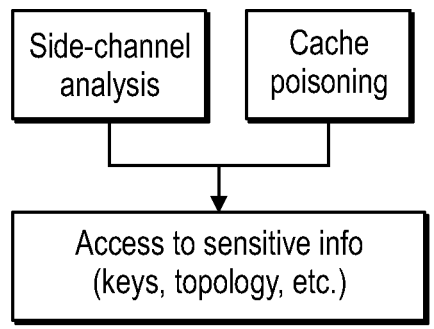
FIGS. 11(a)-(b) depict an aggregated attack graph of malicious peripheral based attacks according to an embodiment of the present invention.
Figure 11B:
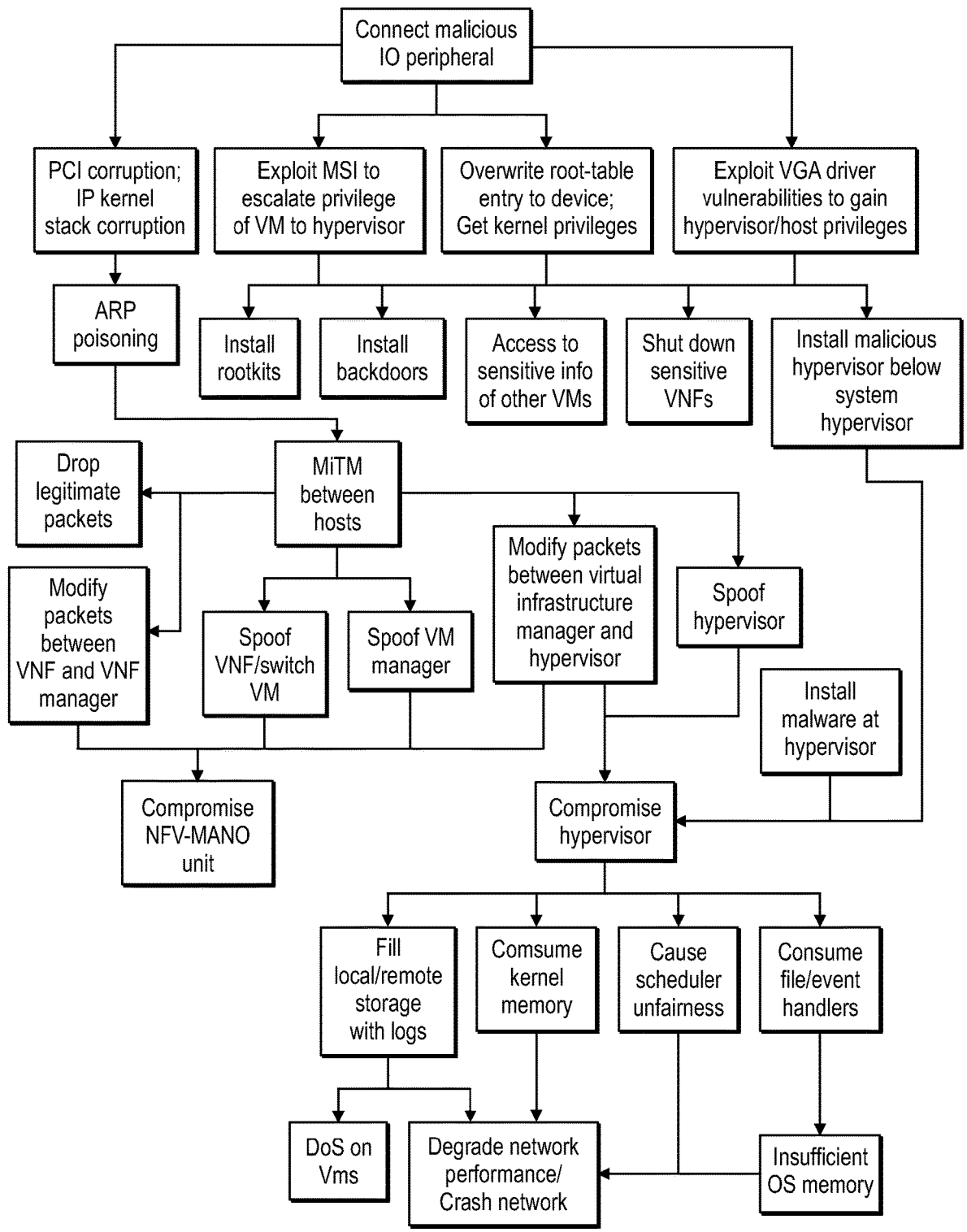

Malicious Peripherals:

The 5GCN is vulnerable to malicious peripheral devices that can potentially compromise the virtualization infrastructure. Input/Output (IO) attacks involve malicious peripherals that make root-level read and write accesses to the DRAM or to the memory embedded in other peripherals. Various attacks involve corrupting the Peripheral Component Interconnect (PCI) to install rootkits, exploiting Message Signal Interrupts (MSI) and VGA driver vulnerabilities for privilege escalation on hypervisors, and overwriting root-table entries to gain kernel privileges. A concise representation of these attacks is shown in the attack graph in FIGS. 11(a)-(b). This attack graph includes 49 attack vectors introduced by malicious peripherals and attacks on physical infrastructure of InP.

The vulnerabilities mentioned in this section require physical access to the infrastructure. Hence, they are less likely to be exploited than NFV and SDN vulnerabilities. However, such attacks are quite common, and their impact is often catastrophic. Thus, it is necessary to take precautions against such attacks while designing the system.

Graph Analysis:

The attack vectors in the graphs are constructed from SDN vulnerabilities, NFV vulnerabilities, and IO vulnerabilities. 113 attack vectors were found total in the four aggregated attack graphs. This is summarized in the table in FIG. 12.

It is observed that many of the unconnected nodes in these graphs can be linked together to generate new possible exploits. This section analyzes the feasibility of connections among the unconnected nodes. A link or a branch is deemed to be feasible if the control/data flow represented by that branch is feasible in a real-world system. For example, nodes 'Exploit test backdoors' and 'Access sensitive information' can be connected because sensitive credentials of a resource can be accessed through backdoors. On the other hand, nodes 'Compromise hypervisor' and 'Flood management ports' cannot be connected because there is a lack of a direct causal relationship between the two.

Connecting a pair of nodes leads to a new directed branch in the graph. A new branch is interpreted as a novel possible exploit of an existing vulnerability. There are two categories of novel possible exploits in this analysis:

Intra-graph: These possible exploits are restricted to one of the four domains, namely SDN-CP, SDN-DP, NFV, and malicious peripherals. For example, when two nodes are connected in FIGS. 7(a)-(c), a novel possible exploit is generated in the SDN-CP.

Figure 8A:
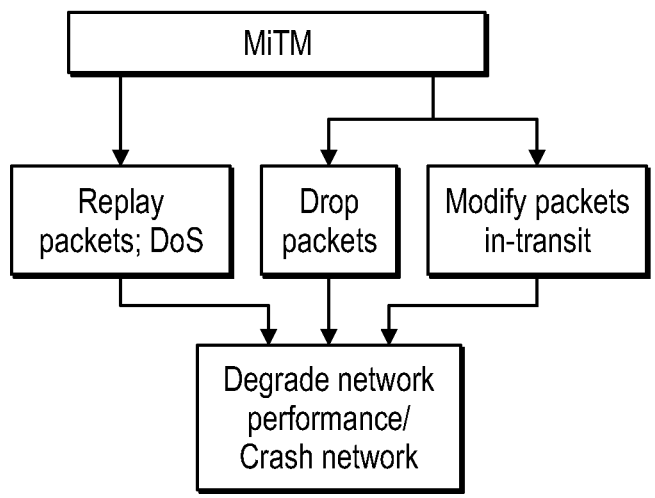
FIGS. 8(a)-(c) depict an aggregated attack graph of SDN data plane vulnerabilities according to an embodiment of the present invention.
Figure 8B:
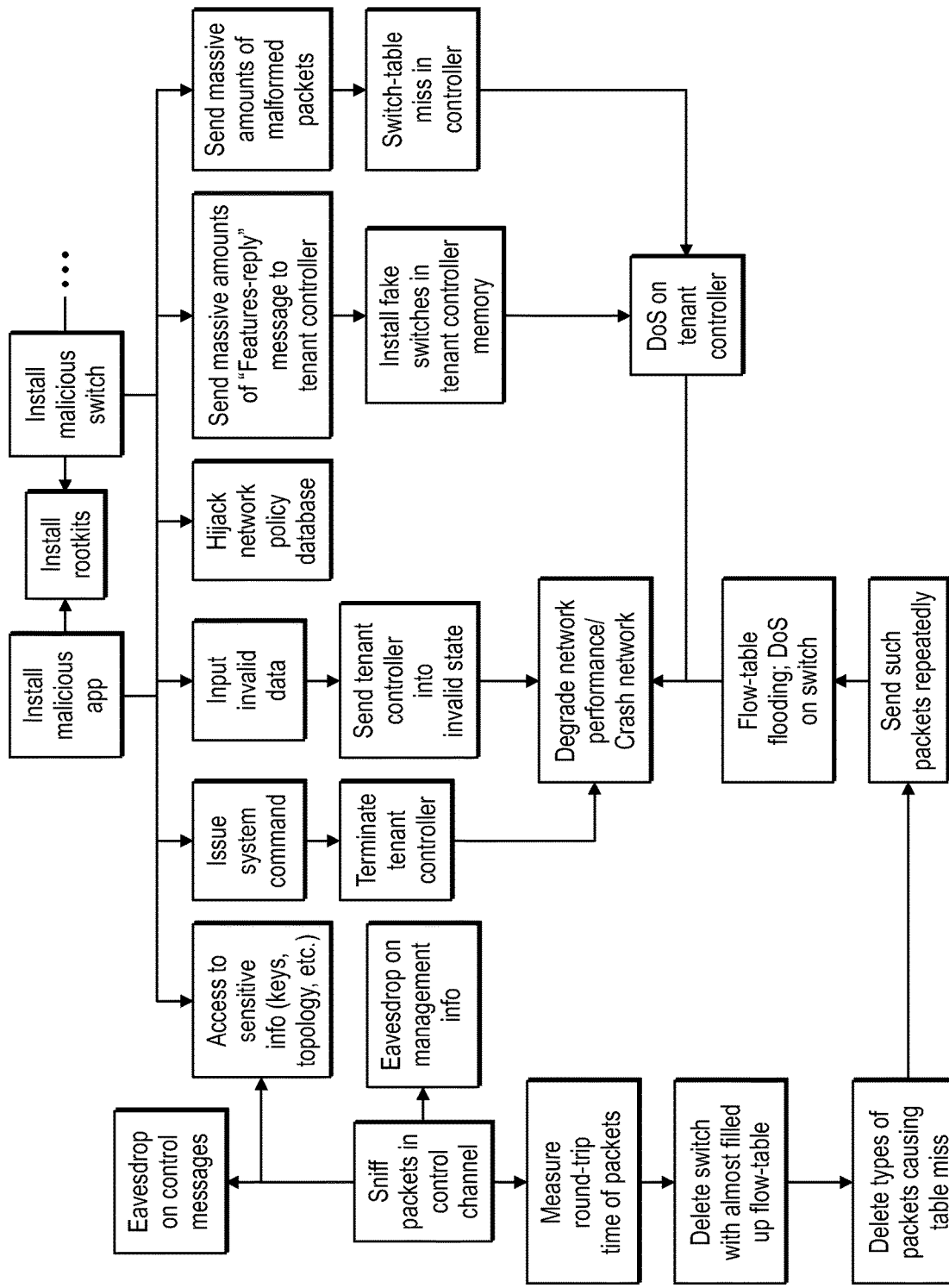
Figure 8C:
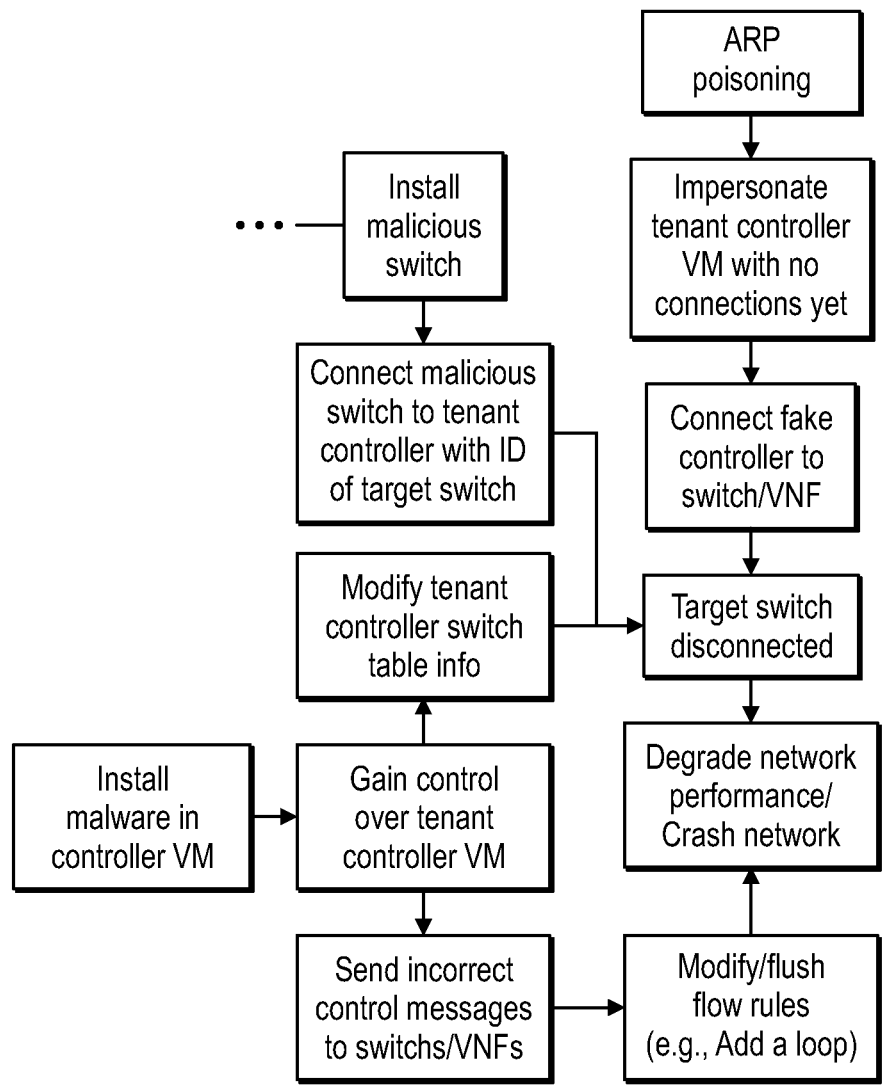

Inter-graph: These possible exploits involve the combination of vulnerabilities of multiple attack graphs. For example, when a node in FIGS. 8(a)-(c) is connected to a node in FIGS. 10(a)-(c), it leads to a novel possible exploit that combines vulnerabilities of the SDN-DP with that of the NFV infrastructure.

Some novel possible exploits are demonstrated in the table in FIG. 13. The number of novel possible exploits per category are stated in the table in FIG. 14.

ML Analysis:

When the number of components in the 5GCN increases, the size of the attack graphs increases significantly due to the quadratic dependence of the size of the search space on the number of nodes in the graph. To add a new node to these graphs, every possible connection between the new node and the existing nodes has to be analyzed, which significantly hinders scalability of this framework. To overcome this obstacle, ML and CSP formulation are employed to predict the possible connections of a new node in the graphs.

Feature Engineering:

Feature engineering is a necessary pre-processing step for using an ML or CSP model. Every possible branch in the graphs has to be represented by a feature vector for it to be processed by the ML or CSP model. The feature vectors of a branch are generated by implementing the following sequence of steps: 1) Assign feature values for individual nodes; and 2) Combine the feature vectors of the constituent nodes of a branch. Various attributes (features) are assigned to the nodes of the attack graph(s) depending on the layer(s) at which it is executed, the type of impact the attack would have on the system and network, and its position in the graph(s).

The set of features that are used herein includes the following: application layer, controller, application controller interface, VNF, network infrastructure, management layer, hypervisor, flooding (DoS), access control, data plane, side-channel analysis (SCA), control channel, sensitive information, SDN-CP, SDN-DP, NFV, malicious peripheral, head, and tail. 1 is assigned to the features that are related to the node and 0 is assigned to the others. For example, the features of nodes 'Install malicious apps' and 'Assign low memory to VM' are demonstrated in the table in FIG. 15. It can be observed that the feature vectors of these two nodes are {1,0,0,0,0,0,0,0,0,0,0,0,1,1,0,0,1,0} and {0,0,0,1,1,1,1, 1,0,0,0,0,0,0,0,1,0,0,0}.

Figures 16, 17:
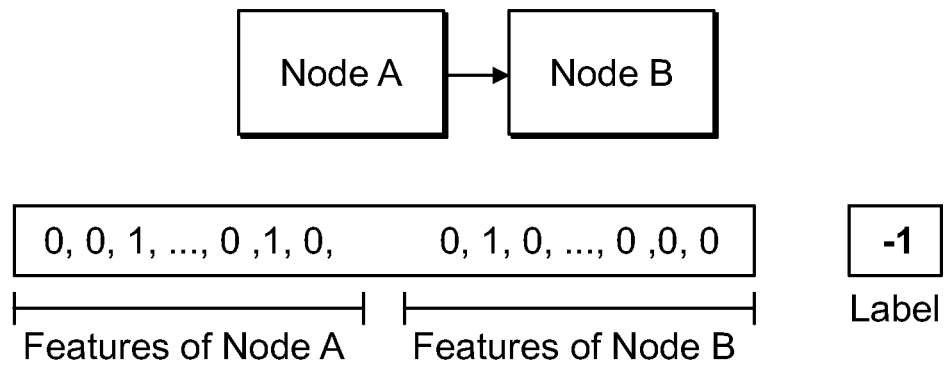
FIG. 16 depicts a graph of constructing a feature vector and label for a plausible branch according to an embodiment of the present invention.
FIG. 17 depicts a table of number of datapoints per graph according to an embodiment of the present invention.

A branch of the graph is represented with an ordered pair of the source and destination nodes, i.e., (source, destination). The feature vector of a branch is obtained by the ordered concatenation of the feature vectors of the source and destination nodes, as shown in FIG. 16. This feature vector constitutes a datapoint for the disclosed ML/CSP model. A positive label (equal to 1) or a negative label (equal to −1) is assigned to this datapoint if the branch is feasible or infeasible, respectively.

All plausible branches are classified into positive and negative examples. The positive examples also include the existing branches in the attack graphs. The dataset for each graph is split into a training set and a test set. The training set is used to train the model and the test set is used to evaluate it. The training set has 85% of the data while the test set has the remaining. The table in FIG. 17 shows the number of instances in the training and test sets for each of the graphs.

Analysis with a CSP Formulation:

A CSP formulation requires creating a set of constraints on the features of the data instances, such that any feature that satisfies all the constraints represents a feasible exploit. To obtain a CSP formulation based on the dataset herein, a set S is generated that contains the feature vectors of all the positive examples in the training set. For prediction, the feature vector of the test instance is checked for whether belongs to S. If it does, a positive label is assigned to it; else, a negative one.

ML Models:

Multiple ML models are trained on the data herein and the best performing ones are chosen for the final ensemble model. The performance of these models is reported in the next section. In this section, the various ML models are briefly described.

Naive Bayes: Naive Bayes is a probabilistic ML algorithm based on Bayes theorem. The Naive Bayes model assumes that features are independent of each other, given the label. Let the class label be denoted by y and the input features $\{x_1, x_2, \ldots, x_n\}$. Assuming feature independence, the probability of label y can be calculated as:

$$P(y|x_1, x_2, \ldots, x_n) = \frac{P(y)\prod_{i=1}^{n} P(x_i|y)}{\prod_{i=1}^{n} P(x_i)} \quad (1)$$

The class label with the highest conditional probability is assigned to a test instance, i.e., prediction=argmax $P(y|x_1, x_2, \ldots, x_n)$. The probabilities $P(x_i|y)$, $P(x_i)$, and $P(y)$ can be obtained by constructing a frequency table of the features from the training data. Herein, the Gaussian Naïve Bayes classifier was used, where the likelihood of the features is assumed to be a Gaussian distribution.

Decision Tree: A decision tree classifier uses a decision tree to assign class labels. A decision tree can be expressed as a logical expression composed of 'AND' and 'OR' boolean operators. The leaf nodes of the tree represent the class labels. The other nodes represent conditional tests on the data attributes. Edges between two nodes represent control flow transition that depends on the outcome of the conditional test at the source node.

k-Nearest Neighbors (k-NN): The k-NN algorithm assigns a datapoint to the most popular class label among its k (k≥1) nearest neighbors. k={1,2,3,4,5,6,7} was used herein. It was observed that the performance on the data initially increased with an increase in k until k=3. Then, it either stopped increasing or started decreasing. Hence, k=3 was chosen.

Support Vector Machine (SVM): For an n-dimensional dataset, SVM constructs an (n−1)-dimensional separating hyperplane that serves as the decision boundary. SVM can generate nonlinear decision boundaries with the help of kernel transformations based on a quadratic optimization algorithm. Various parameters of the SVM model were adjusted and it was observed that the most effective kernel for the data was the radial basis function. The class imbalance effects are mitigated through data preprocessing.

Artificial Neural Network (ANN): ANNs are loosely modeled after the biological neurons in the brain. An ANN variant called the multi-layer perceptron (MLP) is used. The neurons in a MLP model are arranged in multiple layers. Every neuron receives signals from all the neurons in its previous layer. All these signals are weighted by their corresponding edge weights and their weighted sum is passed through a nonlinear activation function. This output is then propagated to all the neurons in the next layer. The training process involves updating the edge weights so that the prediction error is minimized. Here, two-layer MLPs with the ReLU activation function yield the best results.

Performance Results:

This section compares the performance of various ML algorithms on the data. The Negative Predictive Value (NPV) is used to evaluate the ML models. NPV is defined as the fraction of correct negative predictions, as shown in Equation (2). The models are combined with highest NPVs to obtain the final ensemble model. The ensemble model is evaluated with additional metrics like precision, recall, F1 score, Matthew's correlation coefficient (MCC), and classification accuracy.

$$NPV = \frac{\text{True Negative}}{\text{True Negative} + \text{False Negative}} \quad (2)$$

The framework herein is configured in such a way that a security analyst, who uses the framework, can trust the negative predictions of the model with high confidence to be infeasible exploits. Then, the analyst only needs to manually examine the positive predictions for possible exploits. This significantly reduces the amount of manual effort needed. The NPVs of the models are shown in the table in FIG. 18.

A stratified three-fold cross validation is used for evaluation of the models. Stratified cross validation ensures that each fold has an equal ratio of positive and negative labels.

The dataset is quite imbalanced with a much higher fraction of negative examples. To mitigate its impact, the positive examples are resampled n times, where the value of n changes for different algorithms. The value of n varies between 3 and 12. It is observed that this is highly effective for all the ML models, except k-NN.

The models with the highest NPVs (as shown in FIG. 18) are selected and combined into an ensemble model. For the intergraph dataset, although the Naive Bayes and k-NN (k=3) models have perfect NPV values, these models are not selected. This is because Naive Bayes and k-NN have very low precision values of 0.005 and 0.008, respectively, on this dataset. This overshadows their perfect NPV scores. The final ensemble model is shown in the table in FIG. 19. The numbers in the parentheses indicate the number of neurons in the two hidden MLP layers.

In the table in FIG. 20, the confusion matrix of the final ensemble model is shown. The confusion matrix reports the true positives (TP), false positives (FP), false negatives (FN), and true negatives (TN).

In FIG. 20, it is observed that there are 93 positive predictions. The disclosed framework can reduce the search space of manual analysis to 93 instances from the original search space of 1625 instances. This is a 94.3% reduction in manual effort. Manual examination of these 93 instances leads to the discovery of the 26 true positives as novel possible exploits. The drawback of using the ML/CSP approximation is that it fails to include the 15 false negatives in the search space, thus missing the detection of 15 novel possible exploits.

The final ensemble model is evaluated with the following metrics.

Precision: Precision is defined as:

$$\text{Precision} = \frac{TP}{TP + FP} \quad (3)$$

A higher precision implies a lower FP. This implies that smaller manual effort is devoted to manually examining infeasible exploits, thus resulting in higher automation efficiency.

Recall: Recall of a model is defined as:

$$\text{Recall} = \frac{TP}{TP + FN} \quad (4)$$

A high recall value enables the user of the framework to discard the negative predictions from the manual examination set with high confidence. This requires the model to have a minimal FN.

F1 Score: F1 Score is the harmonic mean of precision and recall and is defined as:

$$F1 = 2 \times \frac{\text{Precision} \times \text{Recall}}{\text{Precision} + \text{Recall}} \quad (5)$$

F1 score aims to strike a balance between precision and recall. It is a useful metric when there is an uneven class distribution.

MCC: MCC is a measure of quality of a binary prediction algorithm. It performs well even for imbalanced classes. It return a value between −1 and +1. −1 corresponds to a complete disagreement between observation and prediction, 0 corresponds to random guessing, and +1 corresponds to a perfect prediction system. It is defined as:

$$MCC = \frac{TP \times TN - FP \times FN}{\sqrt{(TP + FP)(TP + FN)(TN + FP)(TN + FN)}} \quad (6)$$

Accuracy: Accuracy portrays the overall performance of the framework. It is defined as:

$$\text{Accuracy} = \frac{TP + TN}{TP + FP + TN + FN} \quad (7)$$

The various performance metrics of the final ensemble model are presented in the table in FIG. 21. A high NPV and accuracy are obtained. However, the precision, recall, and F1 scores are not as impressive as the NPV and accuracy. This shows that there is a trade-off among the various metrics. If the final ensemble model is constructed with a high F1 score, then the NPV suffers. This is a trade-off that has to be made by the security analyst. Since NPV was prioritized here, the precision and F1 scores suffer.

5G-AKA Example

The novel possible exploits of the 5GCN reported in the previous sections can lead to novel attacks at the higher layers of the network or increase the ease of execution of existing attacks in the protocol and application layers. In this section, the impact of 5GCN vulnerabilities on the protocol layer is demonstrated.

Authentication key agreement (AKA) is used in telecommunication networks to establish a secure and authenticated connection between the subscribers and service providers. It enables sharing of a secret key between the user and service provider that is used to secure all further communication.

The AKA protocols have evolved through generations of telecommunication networks. Today, the most widely used authentication mechanism in such networks is the 4G-AKA. The 3GPP Consortium has configured 5G-AKA to provide superior privacy and security guarantees than 4G-AKA. However, it has been shown that multiple 4G-AKA vulnerabilities still persist in 5G-AKA. 5G-AKA is also vulnerable to novel attacks that were not possible in previous generations of networks. The 5G-AKA protocol can be easily compromised if the 5GCN is vulnerable. This section analyzes the implications of the novel possible exploits on 5G-AKA security.

5G-AKA Protocol:

The 5G-AKA protocol 300 authenticates a user equipment (UE) 302, a serving network (SN) 304, and a home network (HN) 306 to each other. It is a challenge-response based protocol where the UE 302 is authenticated as a legitimate user only if it succeeds in providing the expected response to a challenge provided by the HN 306. Unlike previous networks, the identity of the UE 302, called subscriber permanent identifier (SUPI) in 5G networks, is not sent directly. In 5G networks, the UE 302 sends a subscriber concealed identifier (SUCI) that prevents international mobile subscriber identity catcher attacks.

Figure 22:
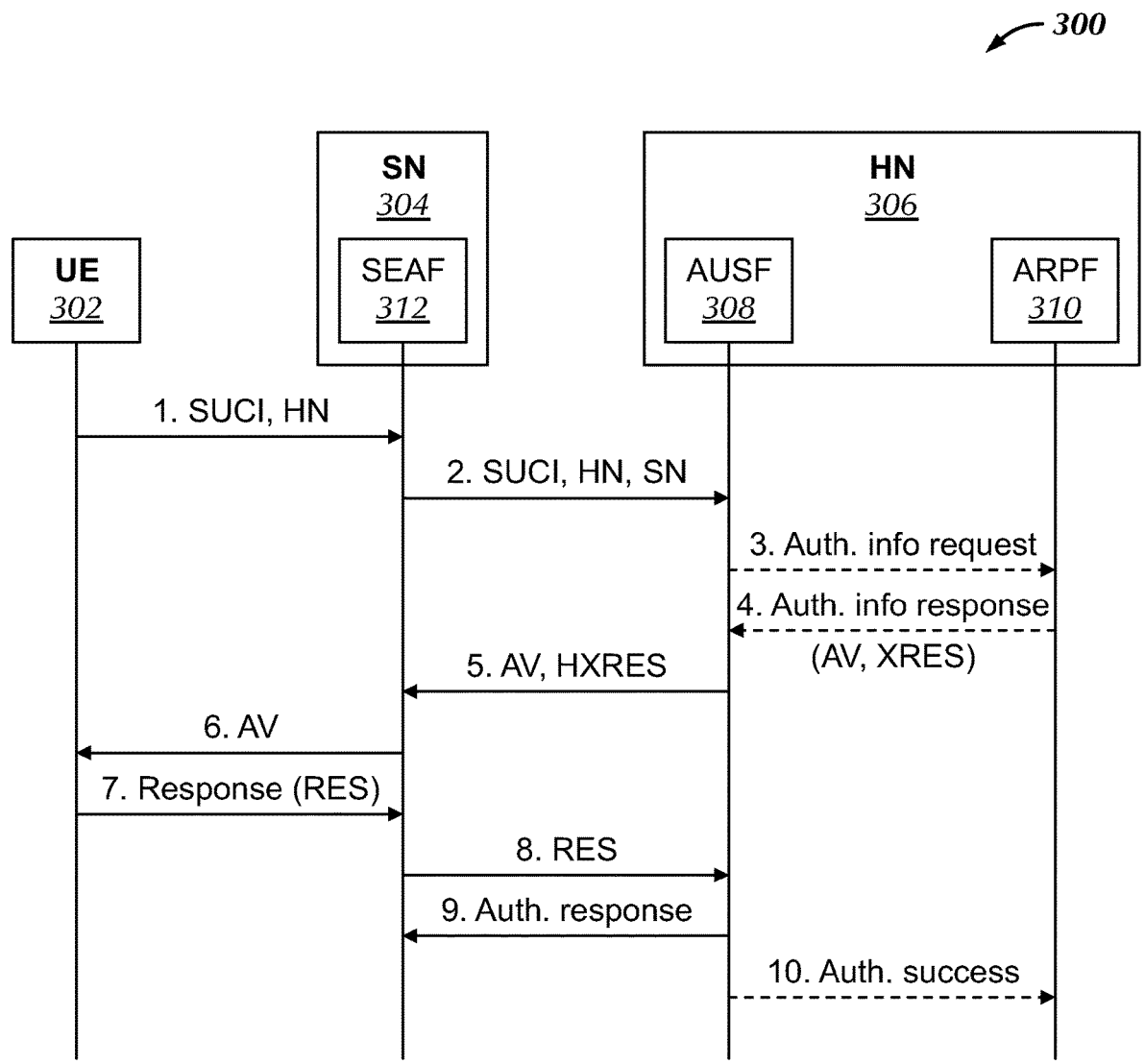
FIG. 22 depicts a 5G-AKA protocol flow where dashed lines represent secure channels according to an embodiment of the present invention.

Often, the SN 304 and HN 306 are the same network. However, sometimes they are different. For example, when a UE 302 is roaming, its SN 304 is different from its HN 306. In this analysis, a separate SN 304 and HN 306 are considered because this scenario is more prone to attacks. The primary network functions involved in 5G-AKA are the Authentication Server Function (AUSF) 308, Authentication Credential Repository and Processing Function (ARPF) 310, and Security Anchor Function (SEAF) 312. A simplified outline of the 5G-AKA protocol 300 is shown in FIG. 22. The details of the messages are abstracted for simplicity. AV denotes the authentication vector, XRES denotes the expected response from the UE, and HXRES denotes a hash of XRES.

Threat Model:

Most of the security analysis of the 5G-AKA protocol 300 so_far has considered a threat model where the adversary has access to the UE 302 and the communication channels between different networks. The core network infrastructure is considered to be inaccessible to the adversary. From FIG. 22, it can be seen that the AUSF 308 and ARPF 310 communicate over a secure network because they belong to the same network (HN) 306.

However, it was shown previously herein that the internal components of the 5GCN can be compromised. To overturn the assumption of having an impenetrable 5GCN, the attack surface of the 5G-AKA protocol 300 is expanded for the analysis. In the threat model here, an adversary can compromise the network's private channels and the network functions as well. In previous sections, it was demonstrated how VNFs and other network components can be compromised by exploiting_vulnerabilities of SDN, NFV, and IO peripherals.

5G-AKA Security Analysis:

This section analyzes the implications of a compromised 5GCN on the security properties of the 5G-AKA protocol 300. A compromised 5GCN leads to unique exploits and also facilitates exploits that were unrealistic before.

Novel Attacks:

The vulnerabilities of NFV, SDN, and input/output (I/O) peripherals have a variety of potential consequences at the network level. These consequences include flooding (DoS) attacks, termination of sensitive VNFs, passive MiTM attacks (like eavesdropping), hijacking of VNFs, and active MiTM attacks (like modification of in-flight traffic). This section analyzes how these consequences can be exploited to compromise the 5G-AKA protocol 300.

Flooding attacks: The 5G-AKA protocol 300 is vulnerable to session confusion attacks triggered by a race condition in the AUSF-ARPF channel. This attack is demonstrated in FIG. 23. When the ARPF 310 receives multiple authentication requests in parallel, it sends the AVs for all the requests to the AUSF 308 at the same time. This leads to a race condition in which the AUSF 308 is unable to distinguish which AV belongs to which UE 302. Thus, there is a high probability that the AUSF 308 sends the wrong credentials to the users. This is a probabilistic attack whose success rate can be increased with more parallel authentication requests from the adversary.

In the threat model of this attack, the adversary can hijack the VNFs on the SN 304 but not the VNFs on the HN 306. They can hijack the SEAF 312 on the SN 304 and use it to bombard the AUSF 308 with multiple network packets of SUCI(Attkr) simultaneously. The AUSF 308 generates authentication requests, Auth. info. request (Attkr), for all of these packets and sends them to the ARPF 310. When the ARPF 310 receives all these packets simultaneously, along with Auth. info. request (Victim), it leads to a race condition. According to the 5G-AKA protocol specifications, the response of the ARPF 310 does not include the identity of the UE 302. Thus, the simultaneous reception of multiple (AV, XRES) pairs by the AUSF 308 causes a session confusion. It is probable that the AUSF 308 forwards the AV of the victim to the adversary as a result of this confusion. Now, the adversary can authenticate themself as the victim.

Figure 23:
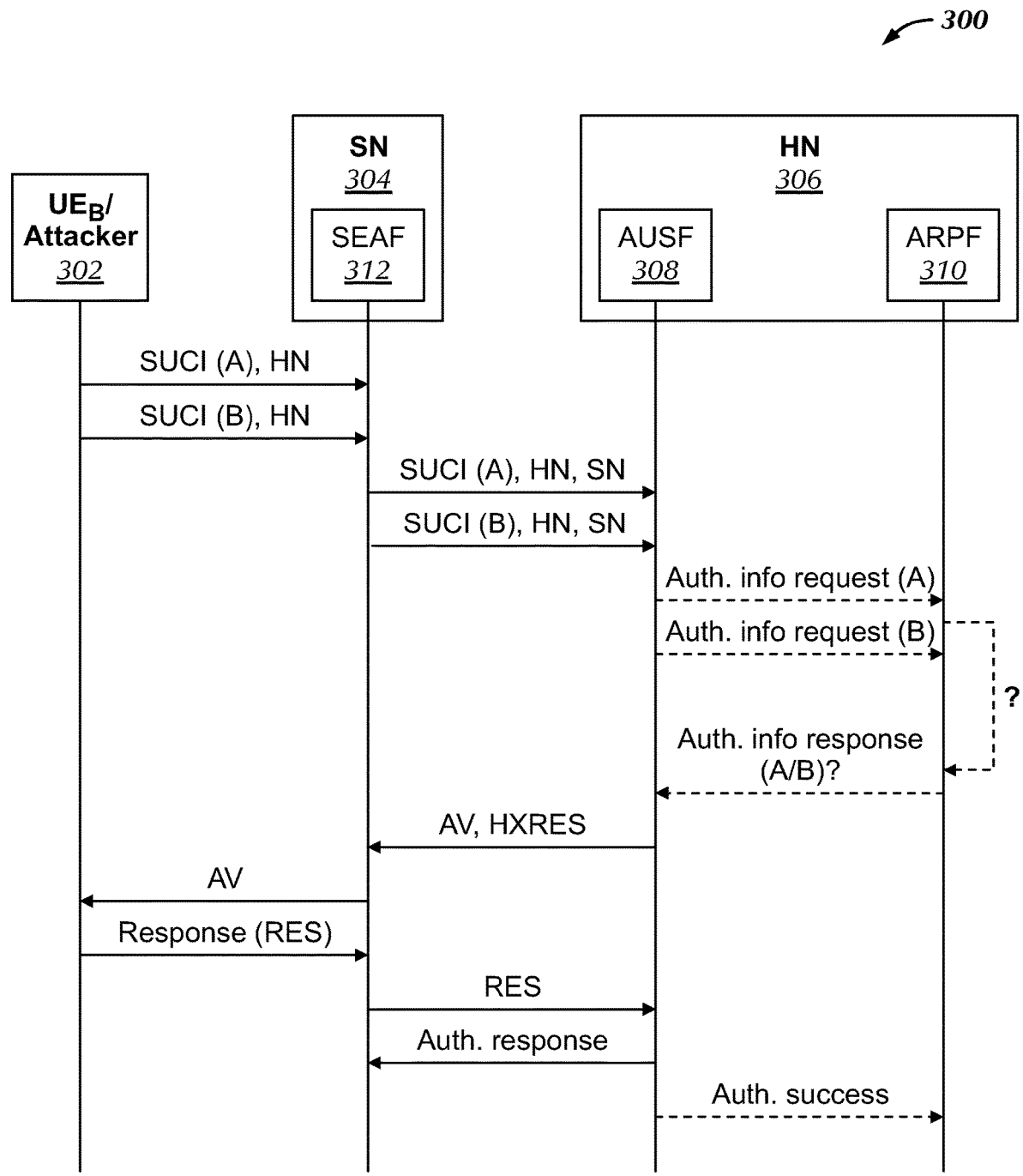
FIG. 23 depicts a 5G-AKA session confusion attack flow according to an embodiment of the present invention.

The probability of success of this attack is $$\left(1-\frac{1}{n}\right),$$

where n depicts the total number of simultaneous authentication requests received by the ARPF 310. In FIG. 23, the value of n is 2; thus, the probability of attack success is 0.5. Increasing the number of simultaneous authentication requests from the adversary's UEs 302 (by replay/flooding attacks from a compromised SEAF 312) will increase n, thus increasing the probability of attack success. The node "Flood VNF with requests/high priority requests" of the NFV attack graph in FIGS. 10(a)-(c) can be implemented via multiple possible exploits discovered by the disclosed framework to execute this attack.

Termination of sensitive VNFs: NFV and IO vulnerabilities can be exploited to forcibly terminate targeted VNFs. This can be achieved by executing one of the following nodes in FIGS. 10(a)-(c): "Shutdown sensitive VNFs," "VNF crash," "DoS on target VNF." The disclosed framework predicts multiple possible exploits for implementing these nodes in a vulnerable 5GCN. Untimely termination of SEAF 312, AUSF 308, or ARPF 310 disrupts the 5G-AKA protocol 300. Although the adverse effects of such attacks can be mitigated by a fault-tolerant implementation of these functions, all ongoing authentication information is lost. This forces the UEs 302 to restart the 5G-AKA protocol 300.

Passive MiTM: Passive MiTM can be executed on the AUSF 308-ARPF 310 channel. Since this channel is considered to be secure by the 5G-AKA designers, it is not required to be encrypted. Operators would also prefer having no encryption to boost performance. In the analysis of attack graphs disclosed herein, multiple attack vectors were generated for launching privilege escalation attacks that give access to 5GCN resources. An adversary with access to the 5GCN infrastructure can eavesdrop on the secure channels. This leads to the disclosure of private information like AV, XRES, SUPI, and the secret keys of AUSF 308 and SEAF 312 to the adversary. The adversary can exploit the knowledge of XRES and SUPI to authenticate themself on behalf of a legitimate UE 302. The secret key of AUSF 308 can be exploited to authenticate a fake base-station, thereby launching active MiTM attacks on UEs 302.

Hijacking of VNFs: Hijacking of sensitive VNFs like the SEAF 312, AUSF 308, or ARPF 310 can cause the 5G-AKA protocol 300 to prevent authentication of legitimate UEs 302 or authenticate adversaries with the credentials of a legitimate UE 302. The methodology disclosed herein demonstrates multiple access control and privilege escalation attacks in the graphs that can be exploited to hijack VNFs.

Active MiTM: Active MiTM attacks involve modifying the packets during transit. This compromises the integrity of network packets. Since the connections in the same network are assumed to be secure in the original 5G-AKA threat model, the operators are not required to have integrity checks on intra-network messages. The adversary can get access to the internal network by exploiting certain infrastructure vulnerabilities and modify the packets in transit. The methodology disclosed herein demonstrates multiple attack vectors for launching active MiTM attacks. The attack graphs in FIGS. 7(a)-(c), 8(a)-(c), and 11(a)-(b) demonstrate that there are multiple openings for MiTM attacks in a vulnerable 5GCN. The adversary can exploit them to modify the AV, XRES, AUSF secret key or SUPI in the AUSF 308-ARPF 310 channel without being detected. Modifying the SUPI or XRES will enable the adversary to authenticate themselves on behalf of a legitimate UE 302. Modifying the AUSF 308 secret key enables the user to launch a fake base station.

5G-AKA Property Violations:

The 3GPP Consortium has detailed the security requirements of 5G system components in TS 33.501 v0.7.0. The security requirements that are related to the 5G-AKA protocol 300 can be expressed concisely through two secrecy properties and seven authentication properties. Every vulnerability of the 5G-AKA protocol 300, including the ones mentioned previously herein, violates at least one of these security properties. Hence, analyzing these properties may provide insights into what kinds of attacks are possible.

The secrecy properties of 5G-AKA are:

S1. The long-term secret key of the UE 302 should be unknown to the adversary.

S2. The adversary should not have access to the secret keys of AUSF 308 and SEAF 312.

The authentication properties of 5G-AKA are:

A1. SN 304 and UE 302 must agree on the identity of UE 302.

A2. UE 302 and SN 304 must agree on the identity of SN 304.

A3. HN 306 and SN 304 must agree on the identity of UE 302.

A4. UE 302 and HN 306 must agree on the identity of HN 306.

A5. UE 302 and HN 306 must agree on the identity of SN 304.

A6. UE 302, HN 306, and SN 304 must agree on the anchor key of SEAF 312, KSEAF.

A7. UE 302, HN 306, and SN 304 must agree that an anchor key KSEAF instance is not used more than once.

The security of the 5G-AKA protocol 300 is compromised if any of the aforementioned properties is violated. It has been shown that the compromise of participating components of the 5G-AKA protocol 300 leads to the violation of these properties. The consequences of compromising the 5GCN on the 5G-AKA properties is demonstrated in the table in FIG. 24.

It is shown that 5GCN vulnerabilities and threats lead to the violation of many of the security properties of the 5G-AKA protocol 300. This demonstrates that 5GCN vulnerabilities also make the 5G-AKA protocol 300 vulnerable.

WhatsApp Security in 5G Networks Example

This section analyzes how various existing and novel possible exploits of a vulnerable 5GCN can lead to targeted attacks in the application layer of the network. WhatsApp application was chosen for the security analysis herein. WhatsApp is the most widely used IM application in the world, with over 1.5 billion users. It is also one of the most secure IM applications, where all communications are end-to-end (E2E) encrypted. This section demonstrates that even WhatsApp can be compromised through network and protocol vulnerability exploits. Various WhatsApp attack vectors that are facilitated by the disclosed methodology include the following.

Impersonation of the victim via 5G-AKA: As described earlier, the adversary can authenticate himself as the victim during 5G-AKA protocol execution by exploiting any of the following attacks: flooding, passive MiTM, hijacking of VNFs, and active MiTM. Then, the adversary can use the victim's identity to impersonate them on WhatsApp.

Assisting WhatsApp impersonation through voicemail cracking: During registration of a WhatsApp account, the user can choose to be authenticated by a text message or a call. If the user chooses to be authenticated by a call and fails to receive the authentication call, then the one-time password voice message is saved in voicemail. It has been shown that voicemails can be easily hacked using brute force attacks. This attack has a low probability of being successful in a real-world situation because it requires the victim to either be offline or ignore the authentication call. This obstacle for the adversary can be bypassed by launching a DoS attack on the victim's network infrastructure. The framework described herein generates multiple novel possible exploits to launch a DoS attack on various components of the 5GCN. FIGS. 7(a)-(c), 8(a)-(c), 10(a)-(c), and 11(a)-(b) show that DoS attacks can be launched on VNFs, VMs, switches, and SDN controllers. A DoS attack on the network infrastructure will terminate the victim's connection to the 5GCN, thus ensuring that they are offline. Now, the voicemail attack has a much higher probability of being successful.

Compromising encryption keys: E2E security of WhatsApp can be readily compromised if the adversary gets access to the WhatsApp encryption keys on the device. The WhatsApp keys are stored in a sandbox memory on the smartphone that is only accessible by the WhatsApp application. If an adversary has root privileges on the phone, they can access the WhatsApp encryption keys. Rootkits can be installed on the UE by combining MiTM attacks in our attack graphs with baseband attacks. Attack vectors that exploit rootkit injection attacks are described in FIGS. 8(a)-(c).

Lack of certificate pinning: WhatsApp does not implement certificate pinning on the UE. This makes the WhatsApp clients vulnerable to MiTM attacks through certificate proxying. The possible exploits for launching an MiTM attack at the network level were described earlier herein. These attacks can be executed in the absence of certificate pinning.

CONCLUSION

The attack graphs depicted in FIGS. 7(a)-(c), 8(a)-(c), 10(a)-(c), and 11(a)-(b) are configured to be as exhaustive as possible, though this is not intended to be limiting. All possible attack classes applicable to SDN, NFV, and malicious peripherals in a 5GCN were attempted to be included in these graphs. For application of the disclosed framework to a specific 5GCN implementation, 5GCN-specific graphs would be derived from the generalized graphs disclosed herein. For a given 5GCN architecture, the relevant nodes from the generalized graphs are extracted to form the architecture-specific graphs. For example, if a 5GCN does not use LLDP to establish network topology, the LLDP-specific nodes would be eliminated from FIGS. 7(a)-(c) for this 5GCN. If a 5GCN has a feature that warrants addition of new nodes to the graphs, ML can be used to predict the connections of the new nodes to the existing nodes. Thus, new nodes can be added to the graphs and create a 5GCN-specific attack graph for further analysis.

Probabilistic attack graphs, more popularly known as Bayesian attack graphs, have been extensively used to assess the security risk of networks. The framework disclosed herein can be extended to Bayesian attack graphs with minimal modifications. In a traditional Bayesian attack graph, each node represents a state of the system. An edge from state A to state B exists if an exploit of a vulnerability at state A takes the system to state B. The weight of this edge is equal to the probability of execution of the aforementioned exploit. Hence, the graphs presented herein can be transformed into equivalent Bayesian attack graphs if the edges have weights corresponding to their probability of execution. These probabilities can be obtained for specific systems from the common vulnerabilities and exposures (CVE) databases. However, the disclosed framework is more useful than Bayesian attack graphs because it can also discover novel possible exploits in a system.

5G communication systems have a huge potential, made possible by the integration of new technologies like NFV and SDN into the 5GCN. This gives rise to new vulnerabilities in the 5G system. As such, generally disclosed herein are embodiments for a system and method to analyze how various vulnerabilities of NFV, SDN, and malicious IO peripherals can interact with each other to compromise the security of the 5GCN. 119 novel possible exploits were discovered by analyzing the underlying patterns in the 113 existing attack vectors in SDN, NFV, and IO peripherals. It was shown that a compromised 5GCN may have devastating consequences on the end user. A compromised 5GCN was shown to trigger five unique types of attacks in the 5G-AKA protocol. These attacks can be further combined with infrastructure vulnerabilities to compromise targeted users at the application layer. This was demonstrated by analyzing four potential security loopholes in the WhatsApp IM application.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method for detecting security vulnerabilities in a fifth generation core network (5GCN), the method comprising:
   constructing an attack graph from a plurality of regular expressions, each regular expression corresponding to a sequence of system level operations for a known 5GCN attack, the attack graph comprising a plurality of nodes, each node representing a system-level operation of the 5GCN, and a plurality of paths, each path representing a 5GCN attack vector;
   performing a linear search on the attack graph to determine unexploited 5GCN attack vectors, wherein a path in the attack graph that does not represent a known 5GCN attack vector represents an unexploited 5GCN attack vector; and
   applying a trained machine learning module to the attack graph to predict new 5GCN attacks, the trained machine learning module configured to determine a feasibility of linking unconnected nodes in the attack graph to create a new branch representing a new 5GCN vulnerability exploit.

2. The method of claim 1, wherein known 5GCN attacks comprise exploiting a vulnerability in at least one of a software defined network (SDN), network function virtualization (NFV), and input/output (I/O) peripheral of the 5GCN.

3. The method of claim 1, wherein new 5GCN attacks comprise exploiting a vulnerability in at least one of a software defined network (SDN), network function virtualization (NFV), and input/output (I/O) peripheral of the 5GCN.

4. The method of claim 1, wherein new 5GCN attacks comprise exploiting a combination of vulnerabilities from at least two of a SDN, NFV, and I/O peripheral of the 5GCN.

5. The method of claim 1, wherein constructing the attack graph further comprises representing each of the plurality of regular expressions as execution graphs.

6. The method of claim 5, wherein constructing the attack graph further comprises combining the plurality of execution graphs into an aggregated attack graph.

7. The method of claim 1, wherein unexploited 5GCN attack vectors are discovered based on a connection of nodes in the attack graph.

8. The method of claim 1, wherein linking unconnected nodes in the attack DAG is feasible when a sequence of operations represented by linking the unconnected nodes can be implemented in the 5GCN.

9. The method of claim 1, wherein the machine learning module comprises at least one of Naïve Bayes, Decision Tree, k-Nearest Neighbors, Support Vector Machines, and Artificial Neural Network.

10. The method of claim 1, further comprising training the machine learning module to predict new 5GCN attacks.

11. The method of claim 10, further comprising constructing a training dataset for training the machine learning module, the training dataset comprising all existing paths in the attack graph as feasible and a plurality of unconnected paths known to be infeasible.

12. The method of claim 11, wherein infeasible branches comprise infeasible sequences of system-level operations.

13. The method of claim 10, wherein the machine learning module is trained based on parameters for achieving higher negative predictive value and accuracy.

14. The method of claim 10, wherein the machine learning module is trained based on parameters for achieving higher F1 score, recall, and precision.

15. A system for detecting security vulnerabilities in a fifth generation core network (5GCN), the system comprising one or more processors configured to:
- construct an attack graph from a plurality of regular expressions, each regular expression corresponding to a sequence of system level operations for a known 5GCN attack, the attack graph comprising a plurality of nodes, each node representing a system-level operation of the 5GCN, and a plurality of paths, each path representing a 5GCN attack vector;
- perform a linear search on the attack graph to determine unexploited 5GCN attack vectors, wherein a path in the attack graph that does not represent a known 5GCN attack vector represents an unexploited 5GCN attack vector; and
- apply a trained machine learning module to the attack graph to predict new 5GCN attacks, the trained machine learning module configured to determine a feasibility of linking unconnected nodes in the attack graph to create a new branch representing a new 5GCN vulnerability exploit.

16. A non-transitory computer-readable medium having stored thereon a computer program for execution by a processor configured to perform a method for detecting security vulnerabilities in a fifth generation core network (5GCN), the method comprising:
- constructing an attack graph from a plurality of regular expressions, each regular expression corresponding to a sequence of system level operations for a known 5GCN attack, the attack graph comprising a plurality of nodes, each node representing a system-level operation of the 5GCN, and a plurality of paths, each path representing a 5GCN attack vector;
- performing a linear search on the attack graph to determine unexploited 5GCN attack vectors, wherein a path in the attack graph that does not represent a known 5GCN attack vector represents an unexploited 5GCN attack vector; and
- applying a trained machine learning module to the attack graph to predict new 5GCN attacks, the trained machine learning module configured to determine a feasibility of linking unconnected nodes in the attack graph to create a new branch representing a new 5GCN vulnerability exploit.

* * * * *